__US012301592B2__

United States Patent
Xu et al.

(10) Patent No.: US 12,301,592 B2
(45) Date of Patent: May 13, 2025

(54) METHOD AND SYSTEM FOR BLOCKCHAIN-BASED CYBER SECURITY MANAGEMENT

(71) Applicants: Board of Regents, The University of Texas System, Austin, TX (US); Government of the United States, as represented by the Secretary of the Air Force, Wright-Patterson AFB, OH (US); New Jersey Institute of Technology, Newark, NJ (US)

(72) Inventors: Shouhuai Xu, Helotes, TX (US); Songlin He, Newark, NJ (US); Eric Ficke, San Antonio, TX (US); Mir Mehedi Ahsan Pritom, San Antonio, TX (US); Huashan Chen, San Antonio, TX (US); Qiang Tang, Cliffside Park, NJ (US); Qian Chen, San Antonio, TX (US); Marcus Pendleton, Rome, NY (US); Laurent Njilla, Rome, NY (US)

( * ) Notice: Subject to any disclaimer, the term of this patent is extended or adjusted under 35 U.S.C. 154(b) by 326 days.

(21) Appl. No.: 17/733,580

(22) Filed: Apr. 29, 2022

(65) Prior Publication Data

US 2023/0042816 A1   Feb. 9, 2023

Related U.S. Application Data

(60) Provisional application No. 63/182,497, filed on Apr. 30, 2021.

(51) Int. Cl.
*H04L 9/40* (2022.01)
*G06Q 20/38* (2012.01)

(52) U.S. Cl.
CPC ....... *H04L 63/1416* (2013.01); *G06Q 20/389* (2013.01); *H04L 63/1441* (2013.01)

(58) Field of Classification Search
CPC ............ H04L 63/1416; H04L 63/1441; G06Q 20/389
See application file for complete search history.

(56) References Cited

U.S. PATENT DOCUMENTS

| | | | |
|---|---|---|---|
| 10,826,945 B1 * | 11/2020 | Xu ........................ | H04L 9/0825 |
| 2020/0027089 A1 * | 1/2020 | Kuchar .............. | G06Q 20/3821 |
| 2020/0235926 A1 * | 7/2020 | Chan ........................ | H04L 9/08 |
| 2020/0372511 A1 * | 11/2020 | Zhang ..................... | G06Q 40/02 |

* cited by examiner

*Primary Examiner* — Mohammad W Reza
(74) *Attorney, Agent, or Firm* — Thomas | Horstemeyer, LLP

(57) ABSTRACT

The present disclosure presents blockchain-based cyber security management systems and related methods. One such method comprises obtaining cyber intelligence input data from a cyber defender computing device, wherein the cyber defender computing device manages network security of a network, wherein the cyber intelligence input data identifies a cyber attacker or a victim of a cyber attack on the network; executing one or more Cyber Security Management (CSM) functions with the cyber intelligence input data received from the cyber defender computing device and cyber data stored in the blockchain ledger, wherein the cyber data stored in the blockchain ledger provides details on a cyber attack on a network that is managed by another cyber defender computing device; and outputting an alert to the cyber defender computing device with a potential cyber attacker or potential victim of the cyber attack on the network managed by the cyber defender computing device.

20 Claims, 21 Drawing Sheets

```
Algorithm 4 T-CSM function T.I (inferring attack paths)
Input: Victim_IP, T, G(t) = {G^{I-D}(t), G^{D-L}(t), G^{L-I}(t)}
  for t ∈ [t_1, t_2] with 0 ≤ t_1 ≤ t_2 ≤ T
Output: Attack_Paths = (V^{AP}, E^{AP}, A^{AP})
1:  V^{AP} ← {Victim_IP}; E^{AP} ← ∅; A^{AP} ← ∅;
2:  for t = t_2 downto t_1 do
3:    Node_Queue ← New FIFO
4:    while Node_Queue is not empty do       ▷ Conduct BFT
5:      for Vertex v ∈ V^{AP} do
6:        Node_Queue.ENQUEUE(v)
7:      end for
8:      Searched_Nodes ← ∅; Current_Node ←
        Node_Queue.DEQUEUE()
9:      if Current_Node ∈ V^{D-L}(t) then
10:       for Vertex v ∈ V^{D-L}(t) do
11:         if A^{D-L}_{v,Current_Node}(t).alerts ≠ ∅ then
12:           if v ∉ V^{AP} then
13:             V^{AP} ← V^{AP} ∪ {v}
14:             for Vertex v' ∈ V^{AP} do   ▷ Initialize empty
              arcs to each existing nodes
15:               A^{AP}_{v,v'}.alerts ← ∅; A^{AP}_{v',v}.alerts ← ∅
16:             end for
17:           end if
18:           A^{AP}_{v,Current_Node}.alerts ← A^{AP}_{v,Current_Node}.alerts ∪
              A^{AP}_{v,Current_Node}.alerts
19:           if v ∉ Searched_Nodes ∪ Node_Queue then
20:             Node_Queue.ENQUEUE(v)
21:           end if
22:         end if
23:       end for
24:     end if
25:     Searched_Nodes ← Searched_Nodes ∪ Current_Node
26:   end while
27:   for sub ∈ {I - D, L - I} do
28:     for Vertex v ∈ V^{AP} do
29:       if v ∈ V^{sub}(t) then
30:         for Vertex v' ∈ V^{sub}(t) do
31:           if A^{sub}_{v',v}(t).alerts ≠ ∅ then
32:             if v' ∉ V^{AP} then
33:               V^{AP} ← V^{AP} ∪ {v'}
34:               for Vertex 0 ∈ V^{AP} do  ▷ Initialize empty
                arcs to each existing nodes
35:                 A^{AP}_{v,v'}.alerts ← ∅; A^{AP}_{v',v}.alerts ← ∅
36:               end for
37:             end if
38:             A^{AP}_{v',v}.alerts ← A^{AP}_{v',v}.alerts ∪
                A^{sub}_{v',v}(t).alerts
39:           end if
40:         end for
41:       end if
42:     end for
43:   end for
44: end for
45: return Attack_Paths = (V^{AP}, E^{AP}, A^{AP})
```

METHOD AND SYSTEM FOR BLOCKCHAIN-BASED CYBER SECURITY MANAGEMENT

CROSS-REFERENCE TO RELATED APPLICATION

This application claims priority to U.S. provisional application having Ser. No. 63/182,497, filed Apr. 30, 2021, which is entirely incorporated herein by reference.

GOVERNMENT RIGHTS STATEMENT

This invention was made with government support under grant Nos. 1801492 and 1814825 awarded by the National Science Foundation, grant No. FA8750-19-1-0019 awarded by the Air Force Research Laboratory, and grant No. W911NF-17-1-0566 awarded by the U.S. Army Research Office. The government has certain rights in this invention.

BRIEF DESCRIPTION OF THE DRAWINGS

For a more complete understanding of the embodiments and the advantages thereof, reference is now made to the following description, in conjunction with the accompanying figures briefly described as follows:

FIG. 4B shows an algorithm for a T-CSM function in accordance with various embodiments of the present disclosure.

FIG. 4C shows another algorithm for a T-CSM function in accordance with various embodiments of the present disclosure.

Figure 1:
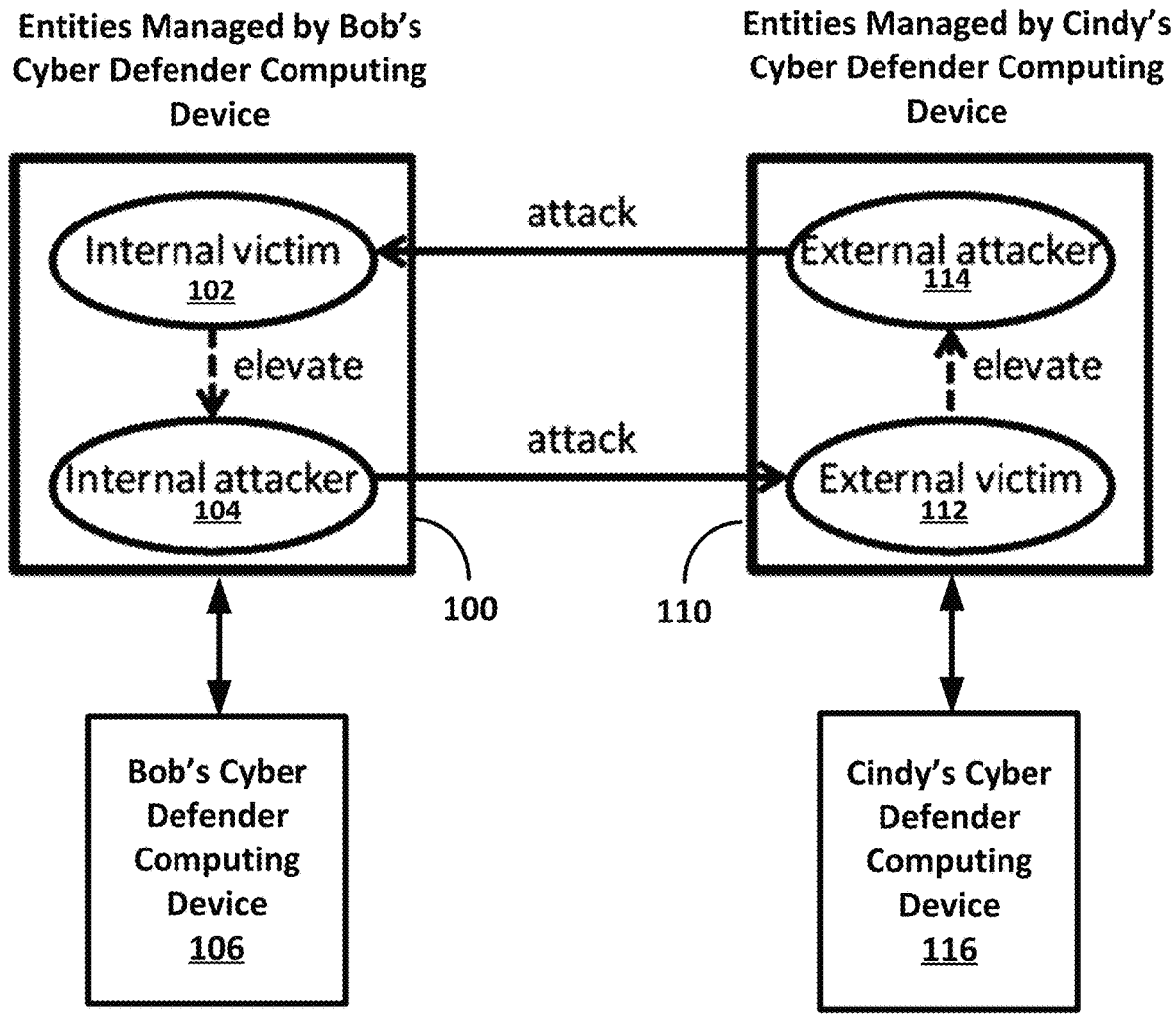
FIG. 1 provides an Illustration of an external versus internal attacker and external versus internal victim from a first defender computing device's (rather than a second defender computing device's) point of view.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments. As used herein, the "present disclosure" refers to any one of the embodiments described herein and any equivalents. Furthermore, reference to various feature(s) of the "present embodiment" is not to suggest that all embodiments must include the referenced feature(s).

Among embodiments, some aspects of the present disclosure are implemented by a computer program executed by one or more processors. As would be apparent to one having ordinary skill in the art, one or more embodiments may be implemented, at least in part, by computer-readable instructions in various forms, and the present disclosure is not intended to be limiting to a particular set or sequence of instructions executed by the processor.

The embodiments described herein are not limited in application to the details set forth in the following description or illustrated in the drawings. The disclosed subject matter is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein the terms "machine," "computer," "server," and "work station" are not limited to a device with a single processor, but may encompass multiple devices (e.g., computers and servers) linked in a system, devices with multiple processors, special purpose devices, devices with various peripherals and input and output devices, software acting as a computer or server, and combinations of the above.

Cyber Security Management (CSM) is intuitive and necessary for any networked systems, including enterprise networks, Internet-of-Things (IoT) networks, and Cyber- Physical System (CPS) networks. However, CSM has not been systematically formulated in a rigorous fashion. As disclosed herein, the study of CSM is elated to cyber intelligence sharing, meaning that the participating cyber defenders share cyber intelligence with each other and leverage the shared cyber intelligence for their routine CSM missions. In particular, the present disclosure focuses on how a cyber defender can leverage such cyber intelligence to answer a range of cyber security questions. The kinds of cyber intelligence we consider include newly detected cyber attackers, which may be leveraged to detect previously undetected victims; newly detected victims, which may be leveraged to detect previously undetected attackers; and new defense capabilities, which may be leveraged to detect previously undetected attacks, among others.

In order to appreciate the importance of CSM, let us consider the following example scenario. Suppose a first cyber defender computing device of a network, such as an enterprise network, is given the nickname "Bob." And, suppose on Mar. 1, 2020, Bob is informed of characteristics of a new Advanced Persistent Threat (APT) attack, which has been active in the wild for a while. Given this piece of cyber intelligence, Bob will investigate whether or not the network (i.e., the network it manages) was penetrated by the APT prior to Mar. 1, 2020 and if so, what the damages are as of Mar. 1, 2020. In current practice, this task (if present at all) would have been done manually, for example by going through some tedious procedure (e.g., manually analyzing the historic network data).

In the present disclosure, the CSM problem is formulated from three perspectives: (i) Network-centric CSM (N-CSM), which evaluates and processes network-layer data for CSM purposes; (ii) Tools-centric CSM (T-CSM), which evaluates and processes data collected from cyber defense tools for CSM purposes; and (iii) Application-centric CSM (A-CSM), which evaluates and processes application-specific data for CSM purposes. For organizing and storing these kinds of cyber data, systems and methods of the present disclosure utilize an Annotated Graph Time Series Representation (AGTSR) to represent data for N-CSM, T-SCM, and A-CSM models.

In accordance with various embodiments, systems and methods of the present disclosure implement one or more specific N-CSM functions, such as: (i) identification details of internal victims of external attackers (see Algorithm 1 in a later discussion); (ii) identification details of external attackers that attacked internal victims (see Algorithm 2 in a later discussion); and/or (iii) identification details of victims that may be attacked by a network or computer attack that caused an internal victim (see Algorithm 3 in a later discussion).

In accordance with various embodiments, systems and methods of the present disclosure implement one or more specific T-CSM functions, such as: identification details of attack path(s) through which internal victims were compromised (see Algorithm 4 in a later discussion); (ii) identification details of victims of zero-day attacks (see Algorithm 5 in a later discussion); and/or (iii) identification details of cascading damage caused by a given external attacker (see Algorithm 6 in a later discussion).

In accordance with various embodiments, systems and methods of the present disclosure implement one or more specific A-CSM functions, such as: (i) identification of internal browsers that may have been compromised by the same attack against a given compromised internal browser (see Algorithm 7 in a later discussion); (ii) identification of internal victim browsers that may have been compromised by an external malicious URL (see Algorithm 8 in a later discussion); and identification of internal victims of some external spoofed URLs (see Algorithm 9 in a later discussion). In various embodiments, the A-CSM functions are exemplified in the context of a web-based application (i.e., URL-browser interactions) but can be equally adapted to other application settings (e.g., emails).

In order to make the resulting N-CSM, T-CSM and A-CSM functions themselves robust against advanced cyber attacks (e.g., APTs that may attempt to compromise the CSM functions), exemplary systems/methods utilize blockchain technology to assure the integrity of the cyber security data mentioned above, leading to an exemplary Blockchain-Based CSM (B2CSM) in accordance with various embodiments of the present disclosure. B2CSM can tolerate the compromise of a certain threshold fraction of the data storage systems (i.e., nodes in the blockchain network).

It is noted that CSM data is often large in volume and thus may not be suitable for storing directly in the B2CSM blockchain (i.e., on-chain); otherwise, it will be very inefficient to run the CSM functions, as retrieving the relevant blocks is time-consuming. In order to cope with this problem, in various embodiments, a fine-grained ledger structure is utilized to seamlessly integrate (i) on-chain storage for small-volume transactions and (ii) off-chain storage for efficiently retrieving large-volume cyber data. This type of design takes advantage of the properties of both blockchain and database technologies, namely security and efficiency, by letting a blockchain act as an intermediate security layer for the nodes to reach consensus on the cyber data before storing the cyber data to the database. As a result, when cyber defenders invoke CSM functions, the CSM functions only need to read large-volume data from the database, which is much more efficient than retrieving a blockchain's on-chain records. This fine-tuned ledger structure leverages the advantages of both blockchain and database systems for decentralized applications, and can be widely applied to cope with large-volume data for blockchain-based applications. To the best of the inventors' knowledge, this method for cyber security applications is novel and unique.

Turning now to the drawings, exemplary embodiments are described in detail. A first cyber defender computing device 106 ("Bob") manages a set of entities 100, which are broadly defined to accommodate computers/devices or other kinds of objects of cybersecurity significance (e.g., browsers or email readers). As illustrated in FIG. 1, a distinction is made between external entities 110 (i.e., the ones that are not managed by Bob but are managed by a second cyber defender computing device 116 (that is given the nickname "Cindy") and internal entities 100 (i.e., the ones that are managed by Bob); it is clear that this external versus internal distinction is from a specific defender's point of view (i.e., Bob in FIG. 1). An entity, internal and external alike, can be in one of three states: normal, victim, or attacker. A victim entity 102, 112 is one that has been compromised by an external or internal attacker entity; an attacker entity 104, 114 is one that exhibits malicious behavior; and a normal entity is one that is neither a victim nor an attacker entity. A normal entity can become a victim entity 102, 112 when it is attacked by an external or internal attacker entity 114, 104; and a victim entity can be elevated to an attacker 104, 114 by attacking another entity.

It is worth mentioning that depending on the specificity of the input cyber intelligence, the victims and attackers identified by the CSM functions may or may not need to be further analyzed for confirming whether or not an entity is indeed a victim/attacker. In the case further analysis is necessary, the value of the CSM functions is in automatically and substantially narrowing down the potential victims and attackers for further investigation.

In the CSM model (FIG. 2), a cyber defender Bob, or more precisely its CSM Application (CSMA) service 202, leverages input cyber intelligence data to identify victim and attacker entities, where the input intelligence may be (i) shared by other defenders or (ii) discovered by cyber defense tools used by Bob's first cyber defender computing device. In what follows, different kinds of cyber intelligence data, classes of CSM functions, and a general data structure design to facilitate CSM functions are presented.

Figure 2:
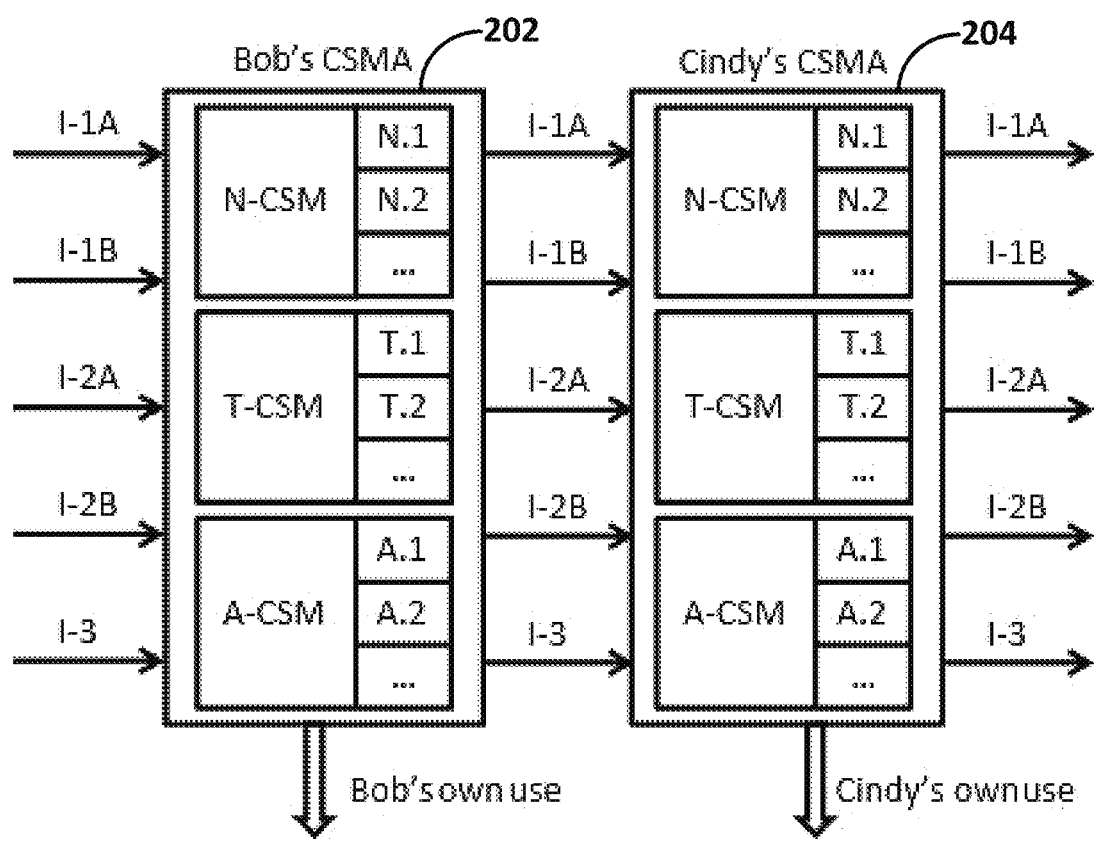
FIG. 2 illustrates a cyber security management model (CSM) model illustrated with five kinds of input cyber intelligence (prefixed by 'I-') and three classes of CSM functions in accordance with various embodiments of the present disclosure.

As illustrated in FIG. 2, input cyber intelligence data (prefixed by 'I-') can include different types of input data, such as, but not limited to: (I-1A) Intelligence that points to some external attackers, possibly accompanied by the time window during which an external attacker is active; I-1B) Intelligence that points to some internal attackers that have attacked some external victims that are detected by another defender, or some internal victims that are detected by some cyber defense tools used by a CSM application (CSMA) service 202 for Bob's first cyber defender computing device; (I-2A) Intelligence that points to some external victims, which have been attacked by some internal or external attackers; (I-2B) Intelligence that points to some internal victims, which have been attacked by some internal or external attackers. The intelligence may be collected, for example, by the leakage of data specific to the victim (e.g., social security numbers or passwords) or by a cyber defense tool (e.g., intrusion detection system or anti-malware tool); and/or (1-3) Intelligence that points to some new defense capabilities, such as methods for detecting previously undetected attacks (e.g., 0-day attacks).

As illustrated in FIG. 2, Bob's CSMA 202 takes as input some of these kinds of cyber intelligence input data and the relevant cyber data (from the blockchain ledger), uses the CSM functions (specified below) to identify other internal attackers/victims and/or external attackers/victims, and possibly shares the resulting intelligence with a CSMA service 204 used by another cyber defender computing device, such as Cindy, about its internal attackers/victims and external attackers/victims (i.e., input cyber intelligence I-1A, I-1 B, I-2A, I-2B from Cindy's point of view).

Having specified various kinds of cyber intelligence as input to CSMAs, specification of CSMA functions that can utilize the intelligence data for CSM purposes is provided next. Given the complexity of CSM, CSM can be divided into different classes, as illustrated in FIG. 2, such as, but not limited to, (i) Network-centric CSM (N-CSM), which utilizes network-layer cyber data and cyber intelligence input data for CSM purposes; (ii) Tools-centric CSM (T-CSM), which utilizes cyber data collected from cyber defense tools and cyber intelligence input data for CSM purposes; and (iii) Application-centric CSM (A-CSM), which utilizes application-specific cyber data and cyber intelligence input data for CSM purposes. Each class contains multiple CSM functions.

For example, N-CSM functions are centered at examining the input cyber intelligence data against network traffic data, which may be collected at a network gateway between an external network (e.g., the Internet) and an internal network (e.g., an enterprise network). In principle, network traffic data can be represented by IP packets and TCP/UDP flows, which incur different costs on storage. As examples, the following N-CSM functions are referred to as N.1, N.2, N.3 and are defined as follows.

An N.1 function is designed to identify internal victims of external attackers, which are given as input cyber intelligence data (i.e., input I-1A). Specifically, at time $t^t$, Bob's first cyber defender computing device obtains cyber intelligence input data that an external attacker, identifiable by its IP address, was active at some point in time during interval $[t_1, t_2]$ where $t^t \geq t_2$. Bob will identify its internal systems that may have been compromised by the external attacker in time interval $[t_1, t_2]$.

An N.2 function is designed to identify external attackers that may have caused the compromise of some internal victims (i.e., input I-2B). Specifically, at time $t^t$, Bob's first cyber defender computing device obtains cyber intelligence input data that an internal victim, identifiable by its IP address, was attacked at some point in time interval $[t_1, t_2]$ where $t^t \geq t_2$. Accordingly, Bob will identify the external IP addresses that contacted victim IP in time interval $[t_1; t_2]$.

An N.3 function is designed to identify potential secondary victims that may have been attacked before, during or after the known compromise of some other internal victim (i.e., input I-2B and/or I-1 B). Specifically, at time $t^t$, Bob's first cyber defender computing device obtains cyber intelligence input data that an internal victim, identifiable by its IP address, was attacked at some point in time interval $[t_1, t_2]$ where $t^t \geq t_2$. Then, Bob will identify other victims that were contacted by the potential attackers that may have compromised the given victim IP during time interval $[t_1, t_2]$.

Additionally, T-CSM functions are centered at cyber defense tools, such as Network-based Intrusion Detection Systems (NIDS) and Host-based Intrusion Detection Systems (HIDS) including anti-malware systems. These cyber defense tools may be based on known signatures, artificial intelligence, or machine learning (AI/ML). Such tools often output alerts as indicators of malicious or suspicious activities. As examples, the following T-CSM functions are referred to as T.1, T.2, T.3 and are defined as follows.

A T.1 function is designed to identify the attack path(s) through which a known internal victim was compromised (i.e., input I-2B). Specifically, at time $t^t$, Bob's first cyber defender computing device is given cyber intelligence input data that an internal victim, say victim IP, was compromised at some point during the time interval $[t_1, t_2]$ where $t^t \geq t_2$. Then, Bob will identify the attack path(s) that may have been leveraged to compromise victim IP.

A T.2 function is designed to identify previous victims of zero-day attacks by leveraging a new defense capability (i.e., input I-3). Specifically, at time $t^t$, the first cyber defender computing device ("Bob") obtains cyber intelligence input data on a new detection method (e.g., attack signature) for detecting a previously unknown zero-day attack (e.g., that exploited a software vulnerability). Then, Bob will identify the internal victims that were attacked according to the new detection method during a past time interval $[t_1, t_2]$ where $t^t \geq t_2$.

A T.3 function is designed to identify the cascading damage caused by a given attacker (i.e., input I-1A or I-1B). Specifically, at time $t^t$, the first cyber defender computing device ("Bob") is given cyber intelligence that a malicious external or internal entity was active at some point in time interval $[t_1, t_2]$ where $t^t \geq t_2$. Then, Bob will identify the entities that were directly or recursively accessed by the malicious entity during time interval $[t_1, t_2]$.

Next, A-CSM functions are centered at specific applications that are often exploited to wage attacks, such as web applications and email systems. Web applications have been widely abused to wage drive-by download attacks (i.e., a vulnerable browser gets compromised when visiting a malicious website or URL) and support attacker's command-and-control (e.g., botnet command-and-control). Emails have been abused to wage social engineering attacks, especially spear phishing, which often preludes devastating attacks (including Advanced Persistent Threats or APT). As examples, the following A-CSM functions are referred to as A.1, A.2, A.3 and are defined as follows.

An A.1 function is designed to identify potential secondary internal victims (e.g., browsers or email users) that may have been compromised by the same attack that succeeded against a known compromised entity (i.e., input I-2B). Specifically, at time $t^f$, Bob's first cyber defender computing device obtains cyber intelligence data that an internal entity (i.e., browser or email user) was compromised at some point in time interval $[t_1, t_2]$ where $t^f \geq t_2$. Then, Bob's first cyber defender computing device will identify the other internal victim entities (i.e., browsers or email users) that communicated with any of the external attacker (i.e., URLs or email users) that compromised the internal victim during time interval $[t_1, t_2]$.

An A.2 function is designed to identify internal victims (e.g., browsers or email users) of an external attacker (namely input I-1A). Specifically, at time $t^f$, Bob's first cyber defender computing device obtains an external attacker (i.e., URL or email address) that was active at some point in time interval $[t_1, t_2]$ where $t_2 \leq t^f$. Then, Bob's first cyber defender computing device will identify the other internal victims (i.e., browsers or email users) that may be compromised because they communicated with the external attacker during time interval $[t_1, t_2]$.

An A.3 function is designed to identify internal victims that may be impacted by known attacks against an external victim (e.g., spoofed URL or email address, namely input I-2A). Specifically, at time N, Bob's first cyber defender computing device obtains cyber intelligence data that an external victim (i.e., URL or email address) was spoofed to wage attacks at some point in time interval $[t_1, t_2]$ where $t_2 \leq t^f$. Then, Bob's first cyber defender computing device will identify the external attackers (i.e., URLs or email addresses) that spoofed the given external victim during time interval $[t_1, t_2]$ and the internal victims (i.e., browsers or email addresses) that communicated with the external attacker during time interval $[t_1, t_2]$.

In order to realize the CSM functions outlined above, appropriate data representations are defined by dividing the time horizon into T+1 time windows at a particular resolution (e.g., hour or day). Such representations can comprise a general data structure, also known as an Annotated Graph Time Series Representation (AGTSR). In order to reduce the number of notations, the following conventions can be used, such as the default use of t, $t_1$, $t_2$ to refer to specific points in time, and the use of the term time window t, $t_1$, $t_2$ to refer to the t-th, $t_1$-th, and $t_2$-th time window, where $0 \leq t, t_1, t_2 \leq T$.

For time window t, G(t)=(V(t), E(t), A(t)) is used to represent the relevant cyber activities for CSM purposes, where V(t) is the vertex set with each vertex representing an entity (e.g., IP address, computer or device), E(t) is the arc set with each arc representing some communication activity, and A(t) is the annotation set such that A(t)={$A_{uv}$(t):(u, v)$\in$V(t)} with $A_{uv}$(t) being a set of annotations associated to (u, v)$\in$V(t)$\times$V(t) and $A_{uv}$(t), count denotes the number of IP packets or TCP/UDP flows along an arc (u, v) in time window t. That is, $A_{uv}$(t).count=0 means (u, v)$\notin$E(t) and $A_{uv}$(t), count>0 means (u, v)$\in$E(t), and count is the number of IP packets or TCP/UDP flows from entity (e.g., IP address) u to entity v in time window t. The meanings of annotations in $A_{uv}$(t) are specific to the class of CSM functions, and will be elaborated below. In principle, G(t) may be stored as an adjacency matrix or list. For simplicity, the present disclosure focuses on an adjacency matrix representation and $A_{uv}$(t) can be seen as an extension to the standard adjacency matrix.

An exemplary CSM model can support division of a network into subnets with both intra- and inter-subnet communications that can be achieved by extending G(t)=(V(t), E(t), A(t)) of time window t to $G^m(t)=(V^m(t)), E^m(t), A^m(t))$, where $v^m(t) \subseteq V(t)$ are the nodes belonging to a subnet and formulating a partition of V(t), (u, v)$\in E^m(t)$ means u, v$\in V^m(t)$, and $A_{uv}^m$ means u,v $\in V^m(t)$. There are also arcs $E^{m,uv}(t)=\{(u, v): u \in V^m(t), v \in V^{m'}(t)\}$. The cybersecurity meanings of these notations are specific to the CSM functions in question.

We define [n]={1, ..., n} and use $\max_{t \in [t_1, t_2]}|V(t)|$ to denote the maximum number of entities (e.g., computers, IP addresses, or browsers) during a time window in between time window $t_1$ and time window $t_2$, namely $$\max_{t \in [t_1, t_2]}|V(t)|=\max\{|V(t_2)|,|V(t_1+1)|, \ldots ,|V(t_2)|\}$$
with $0 \leq t_1 \leq t_2 \leq T$ Similarly, we define $$\max_{t \in [t_1, t_2]}|V^m(t)|=\max\{|V^m(t_2)|,|V^m(t_1+1)|, \ldots ,|V^m(t_2)|\}.$$

Figure 3:
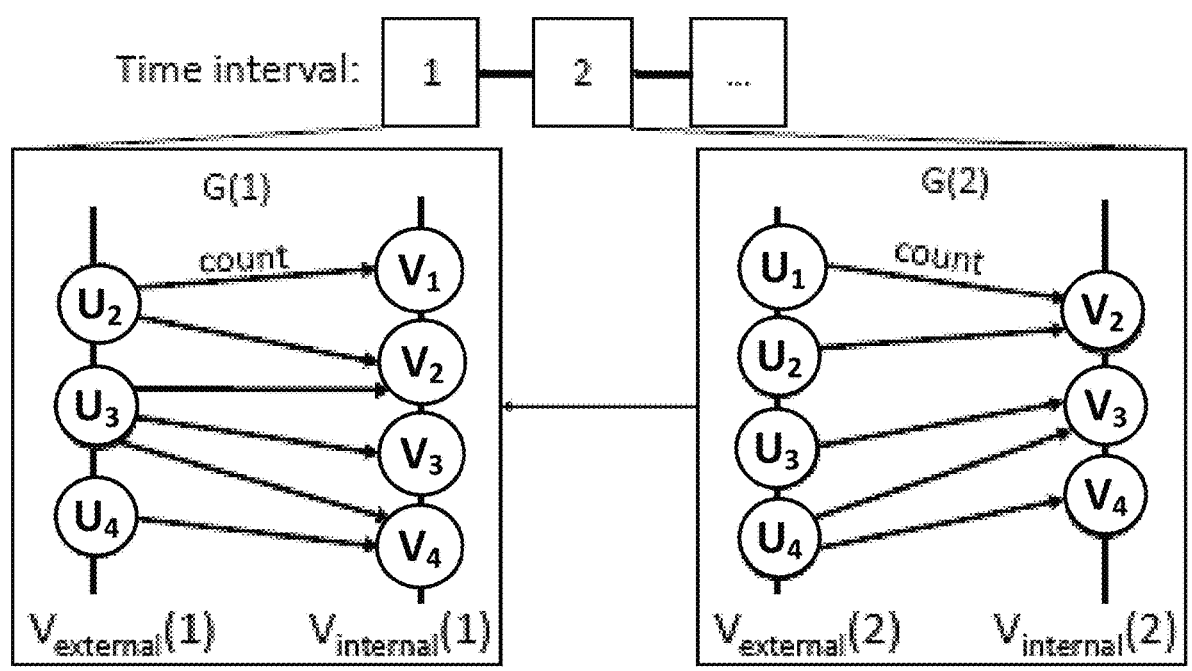
FIG. 3 illustrates an exemplary data structure for a network-centric CSM model (N-CSM) in accordance with various embodiments of the present disclosure.

FIG. 3 illustrates an exemplary data structure for a network-centric CSM model (N-CSM). For the N-CSM data structure, AGTSR can accommodate network communications such that a node u$\in$V(t) represents a computer and an arc (u, v)$\in$E(t) represents the communications between nodes n and initiated by u. In N-CSM, one is often concerned with external-internal communications, meaning the communications between the internal entities and the external entities. In this case, V(t) is partitioned into $V^{external}$ and $V^{internal}$, where $V^{external}$ is the set of external entities (e.g., IP addresses) and $V^{internal}$ is the set of internal entities (e.g., IP addresses). For time window t, there is a G(t)=(V(t), E(t), A(t)) as defined above. FIG. 3 illustrates G(1), G(2), ... ; for example, we have $u_2, u_3, u_4 \in V^{external}(1)$ and $v_1, v_2, v_3, v_4 \in V^{internal}(1)$ where count is only illustrated for $(u_2, v_1) \in E$ $V^{external}(1)$ for a better visual effect.

In various embodiments, for N-CSM functions, Algorithm 1 (below) realizes N-CSM function N.1 by identifying victims. Algorithm 1 considers each time window within a given time interval $[t_1, t_2]$, checking each arc originating from the attacker to identify the entities that were accessed by the attacker. The query returns a list of all such entities. Algorithm 1 has a time complexity $O((t_2-t_1+1) \cdot \max_{t \in [t_1, t_2]}|V^{internal}(t)|)$, where $t_2-t_1+1$ indicates the number of time windows that are considered.

---

Algorithm 1 N-CSM function N.1 (identifying victims)

---

Input: attacker, T, G(t) = (V(t) = $V^{internal}$(t) $\cup$ $V^{external}$(t), E(t), A(t)) for t $\in$ [$t_1$, $t_2$] with $0 \leq t_1 \leq t_2 \leq T$
Output: ⟨t, victims(t)⟩ for t $\in$ [$t_1$, $t_2$]
1: for t $\in$ [$t_1$, $t_2$] do
2:   if attacker $\in$ $V^{external}$(t) then
3:     victims(t) ← ∅
4:     for v $\in$ $V^{internal}$(t) do   ▷ Check victims
5:       if $A_{attacker,v}$(t).count > 0 then
6:         victims(t) ← victims(t) $\cup$ {v}
7:       end if
8:     end for -continued Algorithm 1 N-CSM function N.1 (identifying victims)

```
 9:     end if
10:   end for
11:   return victims(t) for t ∈ [t₁, t₂]
```

In various embodiments, for N-CSM functions, Algorithm 2 (below) realizes N-CSM function N.2 by identifying potential attackers based on their communications to a given victim. Algorithm 2 considers each time window within the time interval $[t_1, t_2]$, checking which attacker entities tried to access the given victim entity. Algorithm 2 has a time complexity $O((t_2-t_1+1) \cdot \max_{t \in [t_1, t_2]} |V^{external}(t)|)$.

Algorithm 2 N-CSM function N.2 (identifying potential attackers)

```
Input: victim_IP, T, G(t) = (V(t) = V^internal(t) ∪
    V^external(t), E(t), A(t)) for t ∈ [t₁, t₂] with 0 ≤ t₁ ≤ t₂ ≤ T
Output: ⟨t, victims(t)⟩ for t ∈ [t₁, t₂]
 1: for t ∈ [t₁, t₂] do
 2:   if victim_IP ∈ V^internal(t) then
 3:     attackers(t) ← ∅
 4:     for α ∈ V^external(t) do      ▷ Check attackers
 5:       if (α, victim_IP) ∈ E(t) then
 6:         attackers(t) ← attackers(t) ∪ {α}
 7:       end if
 8:     end for
 9:   end if
10: end for
11: return attackers(t) for t ∈ [t₁, t₂]
```

In various embodiments, for N-CSM functions, Algorithm 3 (below) realizes N-CSM function N.3 by identifying potential victims that may be attacked by the attacker that caused the compromise of the input victim. Algorithm 3 uses Algorithm 2 to compute the potential external attackers, which are then used to identify the other internal entities that may have been compromised by the potential attackers. The algorithm has a time complexity $$O((t_2-t_1+1) \cdot \max_{t \in [t_2, t_2]} |V^{internal}(t)| \cdot \max_{t \in [t_2, t_2]} |V^{external}(t)|)$$

Algorithm 3 N-CSM function N.3 ( identifying extended victims)

```
Input: victim_IP, T, G(t) = (V(t) = V^internal(t) ∪
    V^external(t), E(t), A(t)) for t ∈ [t₁, t₂] with 0 ≤ t₁ ≤ t₂ ≤ T
Output: ⟨t, potential_victims(t)⟩ for t ∈ [t₁, t₂]
 1: for t ∈ [t₁, t₂] do
 2:   potential_victims(t) ← ∅
 3:   If victim_IP ∈ V^internal(t) then
 4:     temp_attackers ← ∅
 5:     for u ∈ V^external(t) do
 6:       if A_{u,victim_IP}(t).count > 0 then
 7:         temp_attackers(t) ← temp_attackers(t) ∪ {v}
 8:                                  ▷ u accessed victim_IP
 9:       end if
10:     end for
11:     for u ∈ temp_attackers(t) do
12:       for v ∈ V^internal(t) do
13:         if A_{u,v}(t).count > 0 then
14:           potential_victims(t) ← potential_victims(t) ∪
     {v}
15:                ▷ u accessed v and may have compromised it
16:         end if
17:       end for
18:     end for
```

Algorithm 3 N-CSM function N.3 ( identifying extended victims)

```
19:   end if
20: end for
21: return potential_victims(t) for t ∈ [t₁, t₂]
```

Figure 4A:
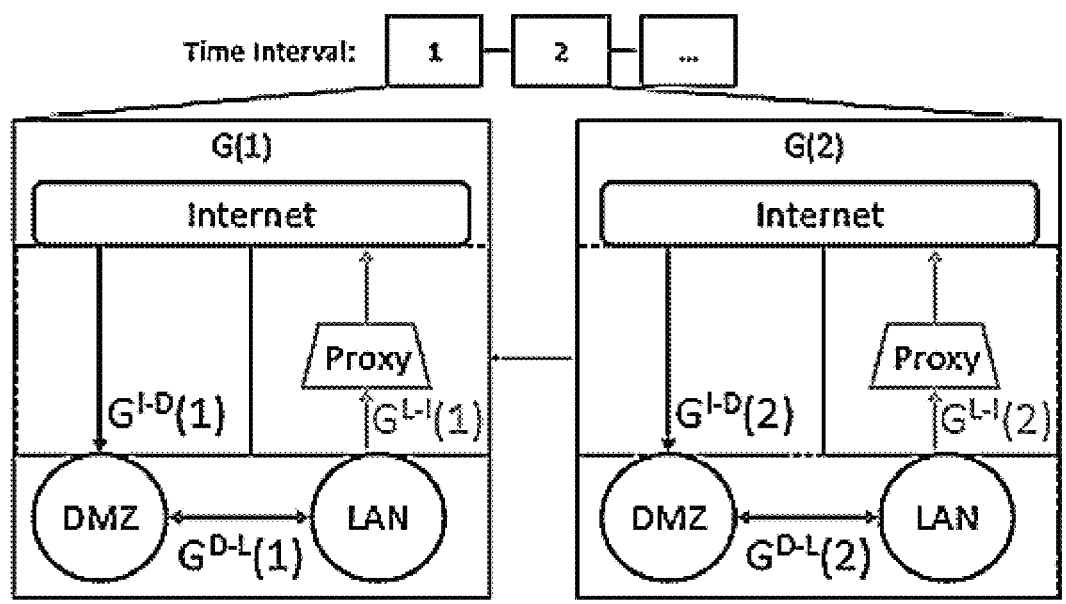
FIG. 4A provides an Illustration of an Annotated Graph Time Series Representation (AGTSR) for representing an enterprise network for the purposes of a tool-centric CSM model (T-CSM) in accordance with various embodiments of the present disclosure.

With respect to T-CSM data structures and functions, FIG. 4A shows an example network that has three disjoint subnets: the Internet (i.e., the external subnet), the demilitarized zone for external-facing servers (DMZ), and the local area network (LAN). Accordingly, Bob's first cyber defender computing device can use (i) an AGTSR to represent the interactions between the Internet and the DMZ, or $G^{I-D}(t)$ for short; (ii) an AGTSR to represent the interactions between the LAN and the Internet, or $G^{L-I}(t)$ for short; and (iii) an AGTSR to represent the interactions within the DMZ, within the LAN and between the DMZ and the LAN, or $G^{D-L}(t)$ for short. It is noted that $V(t)=V^{I-D}(t) \cup V^{L-I}(t) \cup V^{D-L}(t)$. In an exemplary T-CSM model, the annotation of an arc is a list of alerts (i.e., $A_{u,v}(t)=\{alerts\}$), where these alerts are triggered by the traffic across each arc, which often corresponds to a routing path rather than a physical link.

In various embodiments, for T-CSM functions, Algorithm 4 (FIG. 4B) realizes T-CSM function T.1 by inferring the attack paths to the compromised internal entity (e.g., computer or IP address, namely input I-2B) in time interval $[t_1,t_2]$. Algorithm 4 creates a tree of potential attackers from the given compromised internal entity. The tree grows according to the relevant network activities, and add new nodes when new attackers are identified. The resulting tree structure contains the target as the root, compromised internal entities as internal nodes, and all possible attackers as the leaves. Since the given compromised entity belongs to the internal LAN, Algorithm 4's search space originates in $G^{D-L}(t')$ and branches out within the network until all entities have been considered. Once the relevant $G^{D-L}(.)$'s have been exhausted, Algorithm 4 checks both $G^{I-D}(.)$ and $G^{L-I}(.)$ to identify potential external attackers. Algorithm 4 has a time complexity:

$$O((t_2-t_1+1) \cdot \max_{t \in [t_2, t_2]} |V^{D-L}(t)|)^2 + \max_{t \in [t_2, t_2]} | V^{L-I}(t)| \cdot \max_{t \in [t_2, t_2]} |V(t)|)$$

In various embodiments, for T-CSM functions, Algorithm 5 (below) realizes T-CSM function T.2 by retrospectively detecting victims of a zero-day attack during the past time windows prior to discovery of the zero-day attack (i.e. input I-3). The cyber intelligence may come in the form of an alert sequence from either an IDS' output or a previously unexplained anomaly. In either case, the defender needs to look at all previous IDS alerts to find matches. For this purpose, Algorithm 5 traces back over the past time windows in between $t_1$ and $t_2$, by looking at each IDS alert in the set of arc annotations. Algorithm 5 has a time complexity:

$$O(t_2-t_1+1) \cdot ((\max_{t \in [t_1, t_2]} |V^{D-L}(t)|)^2 + \max_{t \in [t_1, t_2]} | V^{I-D}(t)| + \max_{t \in [t_1, t_2]} |V^{L-I}(t)|) \cdot \max_{t \in [t_1, t_2]} |V(t)|.$$

Algorithm 5
T-CSM function T.2 (identifying victims of zero-day attacks)

Input: Attack_Signature, T, G(t) = {$G^{I-D}$(t), $G^{D-L}$(t), $G^{L-I}$(t)} for t ∈ [$t_1$, $t_2$]
with 0 ≤ $t_1$ ≤ $t_2$ ≤ T
Output: ⟨t, Matches(t)⟩ where t ∈ [$t_1$, $t_2$]
1: Matches ← New linked list of empty lists
2: for t ∈ [$t_1$, $t_2$] do
3:   for sub ∈ {I − D(t), D − L(t), L − I(t)} do
4:     for Vertex v ∈ $V^{sub}$(t) do
5:       for Vertex v' ∈ $V^{sub}$(t) do
6:         if Attack_Signature ⊆ $A_{v,v'}^{sub}$(t).alerts then
7:           Matches(t) ← Matches(t) ∪ {(v, v')}
8: return Matches(t) for t ∈ [$t_1$, $t_2$]

Figure 4C:
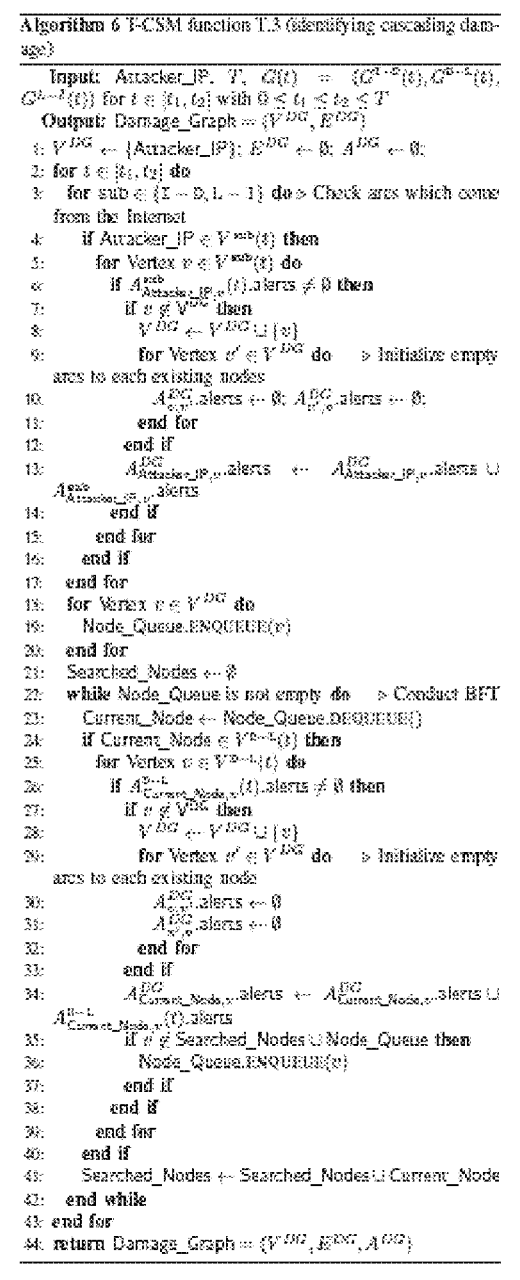

In various embodiments, for T-CSM functions, Algorithm 6 (FIG. 4C) realizes T-CSM function T.3 by identifying the cascading damage of a given attacker (i.e., input I-1A or I-1B). Algorithm 6 determines which entities were targeted by the given attacker, either directly or recursively. Algorithm 6 has a time complexity $O((t_2-t_1+1) \cdot \max_{t \in [t_1, t_2]} |V(t)|^2)$.

Figure 5:
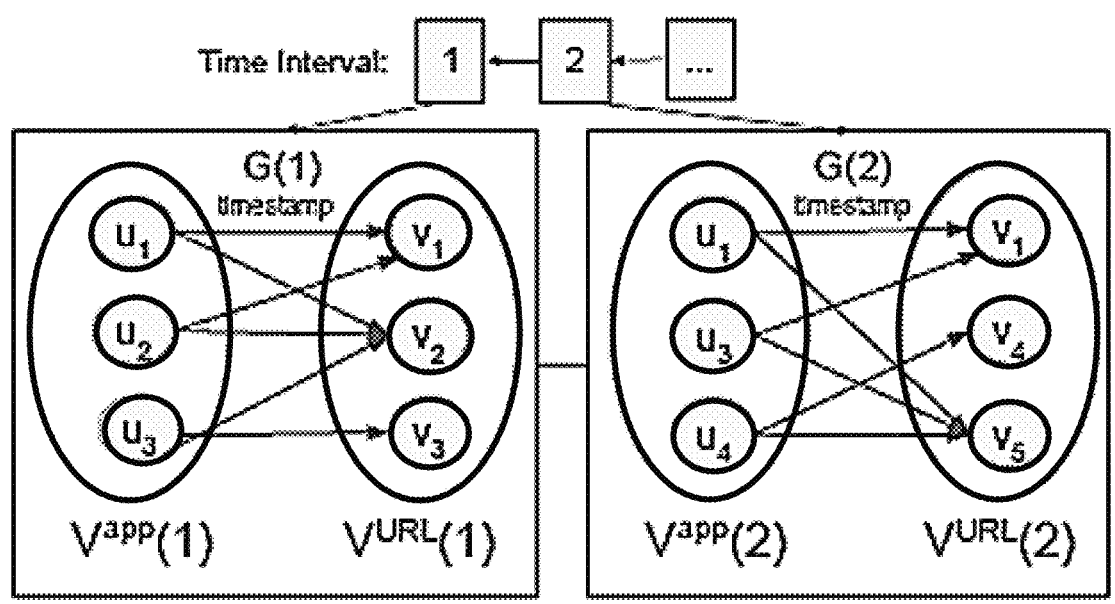
FIG. 5 illustrates the AGTSR for an application-centric CSM (A-CSM) in accordance with various embodiments of the present disclosure.

With respect to A-CSM data structures and functions, the following discussion is directed to a web application. However, the discussion is illustrative and non-limiting and can be adapted to accommodate other applications (e.g., email systems). In the present example, browsers (or their IP addresses) are internal entities and URLs are external entities. Next, FIG. 5 illustrates the AGTSR for an application-centric CSM (A-CSM) in accordance with various embodiments of the present disclosure. As illustrated in FIG. 5, we have G(t)=(V(t), E(t), A(t)), where V(t)=$V^{app}$(t)∪$V^{URL}$(t), E(t) is the arc set such that arc (u, v)∈E(t) means browser u∈$V^{app}$(t) visited URL a v∈$V^{URL}$(t) in time window t, each arc (u, v)∈E(t) is annotated with a timestamp ∈$A_{uv}$(t) and annotation −1 means (u, v)∉E(t).

In various embodiments, for A-CSM functions, Algorithm 7 (below) realizes A-CSM function A.1 by identifying suspicious internal applications (i.e., potentially compromised browsers). The input to Algorithm 7 is a browser as an internal victim (i.e., input I-2B). The output is a set of compromised browsers (internal victims) that have accessed any URLs visited by the given compromised browser during time interval [$t_1$, $t_2$]. Algorithm 7 has time complexity:

$$O((t_2-t_1+1) \cdot \max_t |V^{app}(t)| \cdot \max_t |V^{URL}(t)|).$$

Algorithm 7 A-CSM function A.1 (identifying compromised browsers)

Input: app_id, T, G(t) for t ∈ [$t_1$, $t_2$] with 0 ≤ $t_1$ ≤ $t_2$ ≤ T
Output: ⟨t, suspicious_app(t)⟩ for t ∈ [$t_1$, $t_2$]
1: for t ∈ [$t_1$, $t_2$] do
2:   suspicious_app(t) ← ∅
3:   temp_URL_set ← ∅
4:   for v ∈ $V^{URL}$(t) do
5:     if (app_id, v) ∈ E(t) then
6:       temp_URL_set(t) ← temp_URL_set(t) ∪ {v}
7:       ▷ v was accessed by app_id
8:     end if
9:   end for
10:  for v ∈ temp_URL_set(t) do
11:    for u ∈ $V^{app}$(t) do
12:      if (u, v) ∈ E(t) then
13:        suspicious_app(t) ← suspicious_app(t) ∪ {v}
14:        ▷ app u accessed URL v and is therefore suspicious
15:      end if
16:    end for
17:  end for
18: end for
19: return ⟨t, suspicious_app(t)⟩ for t ∈ [$t_1$, $t_2$]

In various embodiments, for A-CSM functions, Algorithm 8 (below) realizes A-CSM function A.2 by identifying victim browsers. The input to Algorithm 8 is a known malicious URL (i.e., input I-1A). The output is the set of browsers (internal victims) that accessed the malicious URL during time interval [$t_1$, $t_2$]. Algorithm 8 has a time complexity $O((t_2-t_1+1) \cdot \max_t |V^{app}(t)|)$, where $\max_t |V^{app}(t)|$ is the maximum number of browsers that accessed some URLs during a time window.

Algorithm 8 A-CSM function A.2 (identifying victims of a malicious URL)

Input: url_id, T, G(t) for t ∈ [$t_1$, $t_2$] with 0 ≤ $t_1$ ≤ $t_2$ ≤ T
Output: ⟨t, victim_apps(t)⟩ for t ∈ [$t_1$, $t_2$]
1: for t ∈ [$t_1$, $t_2$] do
2:   victim_apps(t) ← ∅
3:   for u ∈ $V^{app}$(t) do
4:     if E(t)[u, url_id] ≠ −1 then
5:       victim_apps(t) ← victim_apps(t) ∪ {u}
6:       ▷ application u accessed url_id
7:     end if
8:   end for
9: end for
10: return ⟨t, victim_apps(t)⟩ for t ∈ [$t_1$, $t_2$]

In various embodiments, for A-CSM functions, Algorithm 9 (below) realizes A-CSM function A.3 by identifying victim browsers of spoofed (e.g., typo-squatted) URLs. The input to the Algorithm 9 is an abused $URL_{url\_td}$ (i.e., input I-2A), The output includes the set of possibly spoofed URLs, denoted by spoofed_urls(t), and the set of potential victim browsers, denoted by victim_apps(t), for t∈[$t_1$, $t_2$].

Algorithm 9 A-CSM function A.3 (identifying victim URLs and victim applications of spoofed URLs)

Input: url_id, T, $\tau_{distance}$, G(t) for t ∈ [$t_1$, $t_2$] with 0 ≤ $t_1$ ≤ $t_2$ ≤ T
Output: ⟨t, spoofed_urls(t), victim_apps(t)⟩ for t ∈ [$t_1$, $t_2$]
1: for t ∈ [$t_1$, $t_2$] do
2:   spoofed_urls(t) ← ∅; victim_apps(t) ← ∅
3:   for v ∈ $V^{URL}$(t) do
4:     if 0 <EDIT_DISTANCE(v, url_id) ≤ $\tau_{distance}$ then
5:       ▷ v spoofed the given URL url_id
6:       spoofed_urls(t) ← spoofed_urls(t) ∪ {v}
7:     end if

```
Algorithm 9 A-CSM function A.3 (identifying victim URLs
             and victim applications of spoofed URLs)

8:   end for
  9:   for v ∈ spoofed_urls(t) do
 10:     for u ∈ V^app(t) do
 11:       if (u, v) ∈ E(t) then
 12:         victim_apps(t) ← victim_apps(t) ∪ {u}
 13:       end if
 14:     end for
 15:   end for
 16: end for
 17: return (t, spoofed_urls(t), victim_apps(t)), t ∈ [t_1, t_2]
```

A straightforward realization of the CSM model highlighted in FIG. 2 would be that each cyber defender computing device secures its own cyber data. However, this realization is vulnerable to single-point-of-failure in a defender's data storage. In order to enhance the robustness of CSM against such attacks, embodiments of the present disclosure utilize blockchain technology in accordance with the Blockchain-Based CSM (B2CSM).

Figure 6:
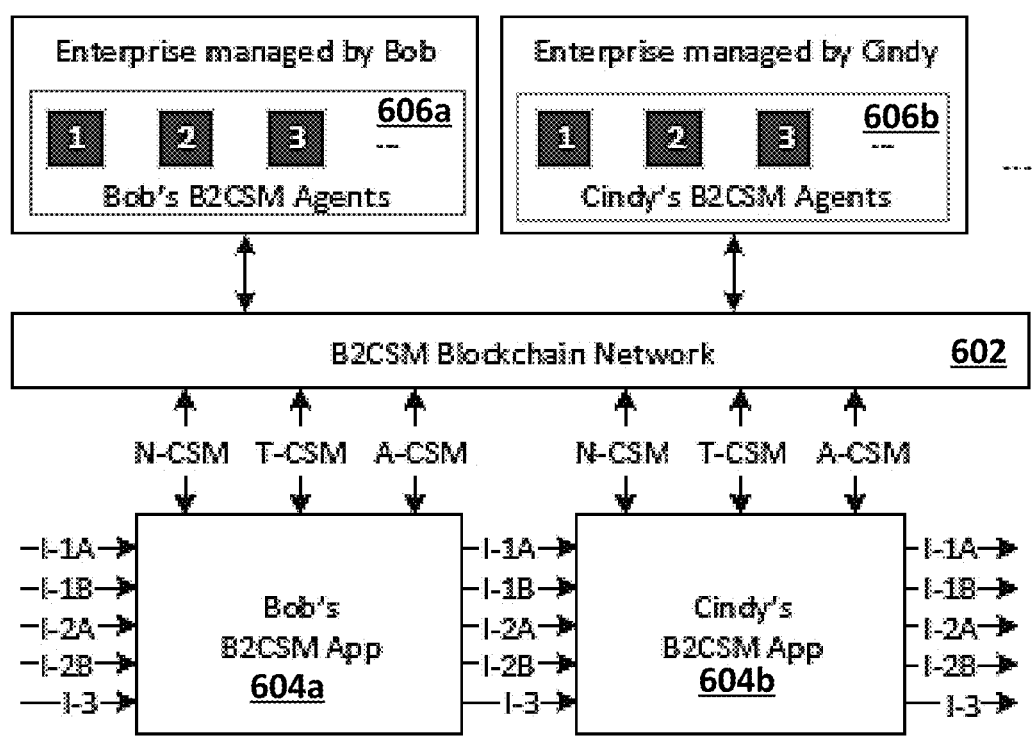
FIG. 6 illustrates a Blockchain-Based CSM (B2CSM) model that extends the CSM model in accordance with various embodiments of the present disclosure.

FIG. 6 illustrates an exemplary B2CSM model, which extends the CSM model (FIG. 2) by storing a cyber defenders' cyber data, G(t)'s, in a B2CSM blockchain network 602. The B2CSM model includes B2CSM applications 604a,b and B2CSM agents 606a,b. B2CSM applications 604a,b act as the interface for cyber defenders to execute CSM functions, by (i) taking as input cyber intelligence data and identifiers of the relevant cyber data and (ii) presenting the output of CSM functions to the cyber defender. B2CSM agents 606a,b collect the relevant cyber data and write the cyber data to the B2CSM blockchain network 602 (for sharing with other cyber defenders).

Figure 7:
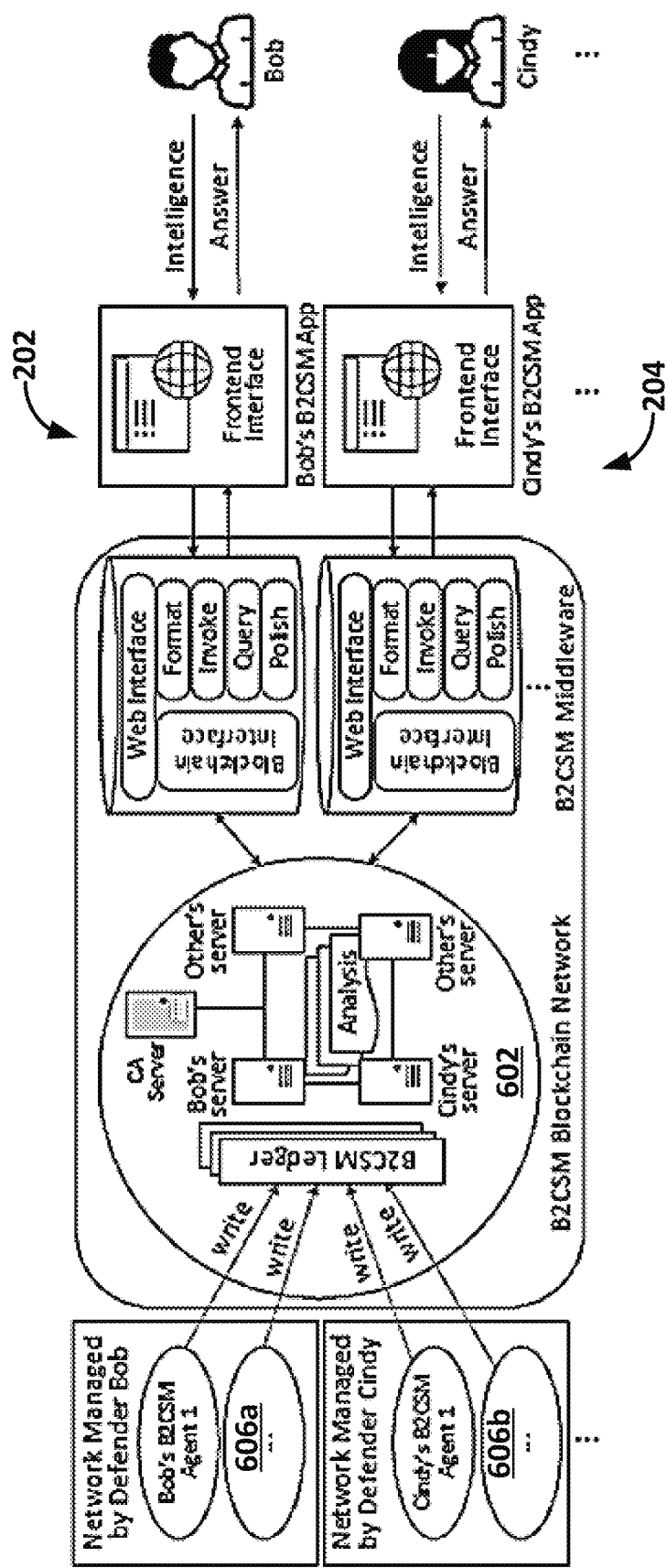
FIG. 7 illustrates a B2CSM architecture in accordance with various embodiments of the present disclosure.

The B2CSM model described in FIG. 6 lends itself to the B2CSM architecture depicted in FIG. 7, which is presented from a cyber defender computing device's perspective. In this exemplary architecture, a cyber defender uses a set of B2CSM agents 606a to collect cyber data from the enterprise network in question; a cyber defender's B2CSM agents 606a,b write the collected cyber data into the B2CSM blockchain network 602; the B2CSM blockchain network 602 is maintained by the cyber defenders; a cyber defender computing device interacts with a B2CSM application 202, 204 (e.g., at a server computing device) to execute CSM functions with input cyber intelligence data; the CSM functions execute at the B2CSM middleware, which may reside at a cyber defender's system (e.g., a cyber defender's full nodes of the B2CSM blockchain, if desired); and/or a Certificate Authority (CA) or multiple CAs are used for access control purposes.

The B2CSM architecture described in FIG. 7 can be instantiated into B2CSM systems in different ways. In various embodiments, an exemplary blockchain ledger comprises a consortium blockchain for B2CSM because the participating cyber defenders have already established some degree of trust with each other in sharing cyber intelligence data. Since CSM is a somewhat sensitive task, permissioned (rather than permissionless) consortium blockchain for B2CSM is used in certain embodiments. Therefore, a CA or multiple CAs can be used to maintain the blockchain network. In one extreme, one consortium CA is sufficient for admitting blockchain nodes, and in the other extreme, each cyber defender may run its own CA as long as the CAs recognize each other's digital signatures. Accordingly, it is natural to adopt the most popular permissioned blockchain platform, namely Hyperledger Fabric (or Fabric for short) as the underlying blockchain platform, in various embodiments.

Since there are different classes of CSM functions (e.g., N-CSM, T-CSM and A-CSM), one chain is used per class of CSM functions in various embodiments. As such, the Fabric channel mechanism readily offers this service, which actually gives cyber defenders flexibility in managing their intelligence sharing. For example, Bob's cyber defender may join the B2CSM consortium for N-CSM functions, but not for T-CSM functions (i.e., Bob neither sends his cyber data with respect to T-CSM to the blockchain network, nor receives others' cyber data with respect to T-CSM). Correspondingly, each channel maintains one unique ledger, which includes a blockchain (i.e., for on-chain data storage) and a state database (i.e., for off-chain data storage). An exemplary blockchain stores two kinds of data: (i) the transactions containing cyber data replication history, such as B2CSM agents' public keys and transaction timestamps; and (ii) the history of cyber defenders invoking CSM functions, for auditing purposes.

Figure 8:
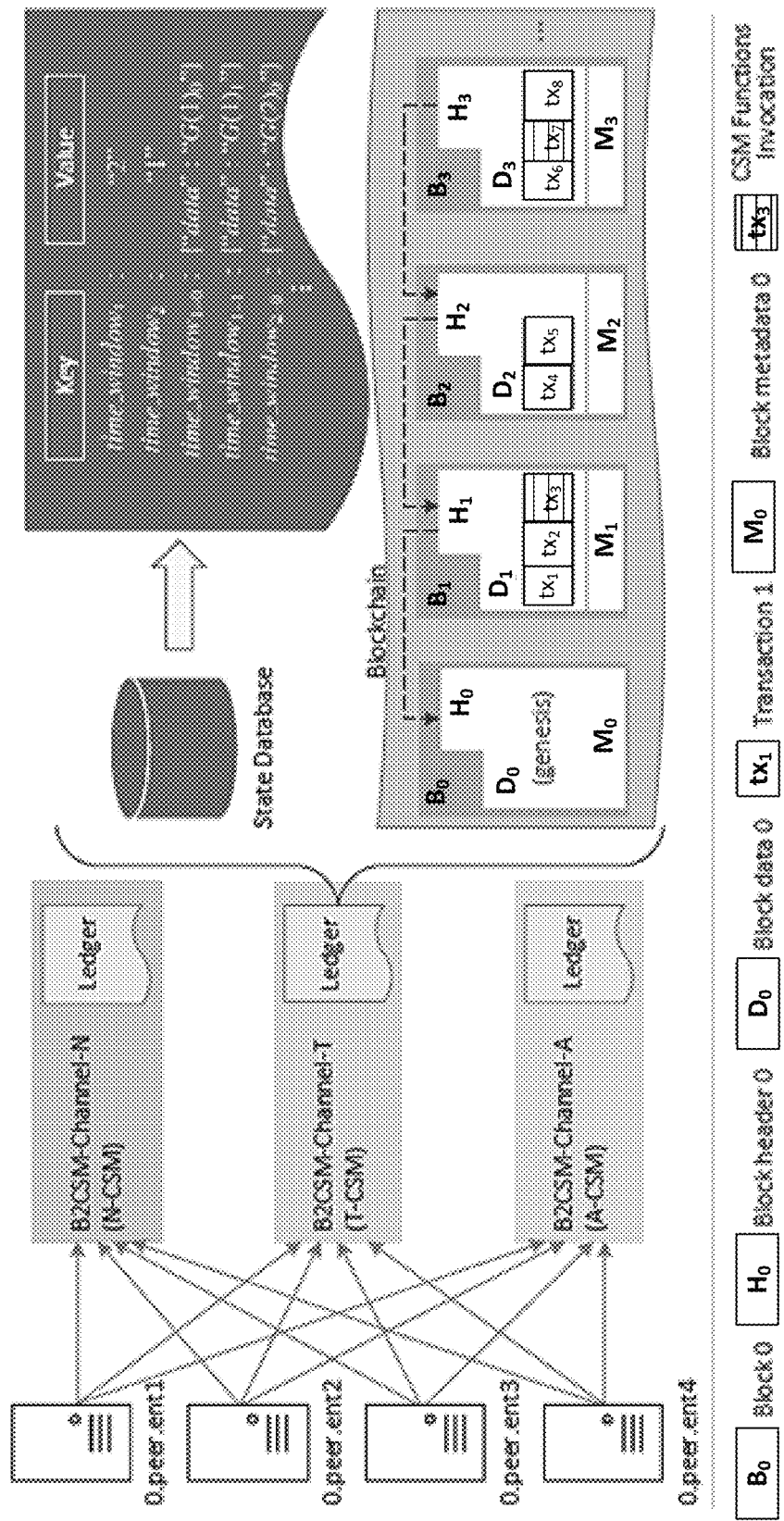
FIG. 8 illustrates a B2CSM ledger structure, namely the blockchain and the state database, in accordance with various embodiments of the present disclosure.

Given that cyber data G(t) is often large in volume and likely not suited for storing in the blockchain (i.e., not using on-chain storage), the present disclosure presents the idea of enforcing a particular kind of on-chain vs. off-chain distinction, which leads to the structure of the B2CSM ledger illustrated in FIG. 8. Specifically, an exemplary state database stores cyber data G(t) in a key-value format to facilitate efficient retrieval. Accordingly, when B2CSM agents submit cyber data G(t), a B2CSM middleware pre-processes G(t) and then writes the pre-processed data to the blockchain network; and the blockchain full nodes write the pre-processed data into their respective state databases after running the consensus protocol to assure the consistence between their state databases. When a cyber defender invokes a CSM function, the blockchain full nodes run the CSM functions, which are implemented as smart contracts, while using the relevant G(t)'s in their state databases and the input cyber intelligence data as input. This fine-grained ledger structure utilizes the advantages of both blockchain and the state database to facilitate the processing of large-volume data by blockchain-based applications. To the best of the inventors' knowledge, this method for cyber security applications is novel and unique.

An exemplary threat model in accordance with various embodiments of the present disclosure considers compromised blockchain network nodes and achieve Byzantine Fault-Tolerance (BFT). It is noted that the Ordering Service Nodes (OSNs) in Fabric v1.x are external nodes (i.e., rather than the blockchain's full nodes) and that the ordering service only supports Crash Fault-Tolerance (CFT) consensus mechanisms such as Zookeeper with Kafka or Raft. In order to achieve a BFT ordering service, BFT-SMaRt, to B2CSM can be used in certain embodiments. Moreover, the ordering service can be executed at the full nodes of the B2CSM blockchain, rather than delegating this service to extra nodes. It is worth mentioning that by design, the nodes running the ordering service are isolated, or different, from the other services (e.g., endorser, committer) on full nodes.

In certain implementations, either a leveldb or a couchdb can be used as the state database. For example, Fabric supports both leveldb and couchdb. Although both support key-value store, couchdb offers rich queries (e.g., the value can be JSON format whereas leveldb only supports string-based queries). Accordingly, in various embodiments, couchdb is adopted as the state database, where a key is the ID uniquely identifying the data corresponding to a time window t, namely G(t), and the corresponding value is G(t) in the JSON format.

In various embodiments, the B2CSM middleware is executed at every B2CSM blockchain full node, which keeps a complete copy of the ledger. The B2CSM middleware has multiple sub-modules, such as formatting a cyber defender's invocation of the CSM functions, interacting with the B2CSM blockchain network, and polishing the output of the CSM functions before returning it to the B2CSM application. These auxiliary services are important because (i) different kinds of CSM functions may require different kinds of data pre-processing, and (ii) the middleware serves as an intermediate level of abstraction to support extensions that may emerge in the future. The B2CSM application takes as input cyber intelligence data and produces an output received from a CSM function to Bob's cyber defender computing device.

For evaluation purposes, in order to analyze the security of B2CSM systems instantiated from the B2CSM architecture, the present disclosure defines the following security objectives: Correctness—the correctness of the outputs of the CSM functions is assured, with respect to the input cyber intelligence and the cyber data G(t)'s; Integrity—the integrity of data, including the cyber data written by the B2CSM agents into the state database and the invocation history of CSM functions stored in the B2CSM blockchain is assured, meaning the data cannot be manipulated without being detected, as long as the fraction of compromised nodes in the underlying blockchain is bounded from above by a certain threshold; Availability—the availability of the data stored in B2CSM system is assured, namely the cyber data written by the B2CSM agents to the state database and the invocation history of the CSM functions stored in the blockchain is always available, as long as the fraction of compromised nodes in the underlying blockchain network is bounded from above by a certain upper threshold; Consistency—the consistency of the data, namely the cyber data written by the B2CSM agents to the state database and the invocation history of the CSM functions stored in blockchain is assured, meaning that all of the honest nodes have the same global view about the data's state, as long as the fraction of compromised nodes in the underlying blockchain platform is bounded by a certain upper threshold; and/or Accountability—the B2CSM agents are held accountable for the data they write into the blockchain network and the B2CSM applications are held accountable for the CSM functions they run against the blockchain.

For evaluation purposes, an exemplary threat model considers an attacker with the following capabilities: (i) Compromising B2CSM blockchain full nodes—The attacker can penetrate into a threshold fraction of the blockchain full nodes. The attacker has total control over these compromised nodes and can coordinate their activities in an arbitrary fashion (i.e., Byzantine); and (ii) Interfering with message deliveries—The attacker can control the order of message deliveries in the blockchain network. The attacker can arbitrarily delay message deliveries to each computer (but not forever, see Assumption 2 below), for example by waging Denial-of-Service (DoS) attacks during a finite period of time.

For the threat model, the following assumptions are also made on what the attacker cannot do. Assumption 1 (cryptographic assurance) is related to cryptography. The present disclosure makes standard assumptions to assure the security of cryptographic schemes (e.g., hash functions and digital signatures) in the framework of modem cryptography. Informally speaking, these assumptions say that as long as cryptographic keys (if applicable) are not compromised, cryptographic schemes are secure. That is, in order for the attacker to compromise a cryptographic assurance, the attacker has to penetrate into a system in question to compromise the cryptographic key or cryptographic service (for attaining "oracle" access to a cryptographic function).

Assumption 2 (communication model) is related to network synchrony. For the B2CSM blockchain network, the present disclosure assumes the communications between the full nodes are partially synchronous, meaning that each message is delivered to the honest nodes within some unknown delay.

Assumption 3 (attacker capability) is related to the compromise of nodes maintaining the blockchain. For the full nodes that maintain the blockchain, the present disclosure assumes that no more than one-third of them are compromised simultaneously, which is inherent to the adopted Byzantine Fault-Tolerance (BFT) protocol under Assumption 2.

Assumption 4 (data and intelligence authenticity) is related to the data collected for CSM purposes. The present disclosure assumes that the integrity of the data collected for N-CSM, T-CSM and A-CSM purposes, namely the G(t)'s mentioned above, is assured. The present disclosure also assumes that the cyber intelligence is authentic. Assuring that these two assumptions hold is an orthogonal research problem because the CSM functions are defined to operate on given inputs; if these inputs are not authenticated, the outputs of the CSM functions are not assured to be correct or useful.

Assumption 5 (B2CSM implementation security) specifies that the attacker cannot compromise a cyber defender computing device (Bob), the B2CSM application, or the B2CSM middleware because compromising these components of the B2CSM system can immediately render it to give arbitrary output as desired by the attacker.

In considering security analysis, implementation details of an exemplary B2CSM system can be assumed away under Assumption 5. The correctness objective, namely the correctness of the output of the B2CSM system, is assured by (i) Assumption 4, which assures the authenticity of the input cyber intelligence; (ii) the integrity of G(t) stored in the state database; (iii) the integrity of the CSM functions or smart contracts processing input cyber intelligence and cyber data G(t); and (iv) no more than one-third of the blockchain full nodes (including their respective state databases) are compromised, which is required by the BFT protocol under Assumptions 2 and 3. The integrity objective, namely that the data stored in B2CSM blockchain cannot be maliciously manipulated, is assured. This is assured by (i) the cyber data G(t) stored in the B2CSM blockchain full nodes' state databases, which is endorsed by multiple blockchain full nodes according to the endorsement policy; (ii) the fact that the B2CSM agents' data-writing history is stored in the B2CSM blockchain and wrapped as transactions; (iii) the B2CSM applications' CSM functions invocation history is stored in the B2CSM blockchain as transactions that are endorsed by a quorum of full nodes. According to Assumptions 1 and 3, the attacker, while able to compromise no more than one-third of the full nodes, can neither mislead the full nodes to write into the B2CSM blockchain any data other than what is collected by the B2CSM agents, nor mislead the full nodes to accept manipulated data returned by the B2CSM blockchain as valid. The availability objective, namely that the B2CSM system can always respond to a cyber defenders' invocation of CSM functions, is assured by the fact that the BFT consensus protocol can tolerate one-third Byzantine full nodes under Assumptions 2 and 3. Although the attacker can deny a defender to run a B2CSM application, the cyber defender can run as many copies of the B2CSM application as needed (e.g., running at dynamically allocated IP addresses that cannot be pinned down by the attacker before finishing the execution of a CSM function). The consistency objective, namely that the cyber data G(t) stored on the B2CSM blockchain full nodes' state databases and the data-writing and CSM function-invocation histories are the same from the B2CSM full nodes' points of view, is assured by (i) the cyber data G(t) collected by the B2CSM agents and the CSM function-invocation activities are submitted as transactions, which go through an execute-order-validate procedure to reach consensus and then are appended to the blockchain; (ii) the data-writing history is consistent because of the consensus protocol. That is, under Assumptions 1, 2 and 3, the BFT consensus protocol assures that the honest full nodes always append the same blocks, in the same order, to their local copy of the blockchain and their state databases, assuring consistent states. The accountability objective, namely that the B2CSM agents and applications can be held accountable for their activities, is assured because (i) when a B2CSM agent writes cyber data G(t)'s to the blockchain, the agent's identity (e.g., public key) and a timestamp are included in the transaction and stored in the blockchain; (ii) when a cyber defender invokes a B2CSM function, the cyber defender's identity and a timestamp are included in a transaction and stored in the ledger. With the aforementioned integrity assurance of blockchain data, any data writing and B2CSM-invocation activities can be tracked, leading to accountability.

For evaluation purposes, a blockchain's performance is often measured by the read/write latency/throughput, which suggests examining the B2CSM blockchain's performance without considering the CSM functions. Specifically, the present disclosure considers the following vanilla metrics: (i) B2CSM blockchain's vanilla read latency, which is defined as the time difference between when a data read request is issued to the blockchain and when the response is received from the blockchain; (ii) B2CSM blockchain's vanilla write throughput, which is defined as total_number_committed_transactions×transaction_size/total_amount_of_time_on_writing_to_blockchain, and the unit can be KBytes/second; (iii) B2CSM blockchain's vanilla write latency, which is defined as transaction_confirmation_time– transaction_submission_time. These metrics can be measured by using "dummy" data (i.e., with no application semantics) because they are geared towards the B2CSM blockchain rather than the CSM functions. Such metrics are measured by taking the average of many independent experimental runs. However, B2CSM might often encounter transactions of large data volumes, in contrast to small transactions at high transaction arrival rates (which is the case with blockchain-based conventional applications like cryptocurrency). Therefore, experiments were conducted to measure the vanilla metrics with large transactions (i.e., transactions with large data volumes), while using the preceding metrics (i)-(iii) for benchmarking the performance of the CSM functions.

The present disclosure presents two CSM-specific performance metrics: (iv) Application Query Latency (AQL) and (v) Data Replication Throughput (DRT). The AQL metric measures the time interval between when a defender invokes a CSM function and when the defender receives the response, namely:

$$\mathcal{T}_{latency} = \mathcal{T}_{reqf} + \mathcal{T}_{cp} + \mathcal{T}_{resf}$$

where $\mathcal{T}_{reqf}$ is the request formatting time (i.e., the time interval between the B2CSM middleware receiving a request from a B2CSM App and the B2CSM middleware submitting the transaction to the blockchain network), $\mathcal{T}_{cp}$ is the chaincode processing time (i.e., the time interval between the blockchain network receiving a transaction and the middleware receiving query result from the blockchain network), and $\mathcal{T}_{resf}$ is the response formatting time (i.e., the time interval between the middleware receiving the result from the blockchain network and the middleware sending the result to the B2CSM application).

The DRT metric measures the performance in writing data to the B2CSM blockchain. Since G(t) is often large in volume, G(t) can be split it into multiple chunks, each with m rows and n columns with each chunk being regarded as a data unit, whose size is limited by the transaction size in blockchain network. If we let |Φ| be the size of G(t) and $\mathcal{T}_{replication}$ be the total time cost for replicating G(t) to the blockchain, then we define DRT=|Φ|/$\mathcal{T}_{replication}$.

The preceding performance metrics (i)-(v) are affected by the following block-cutting parameters that are involved when encapsulating transactions into blocks: batch size (by default, 10 transactions per block); batch timeout (by default, 2 seconds); and block size (by default, 512 KBytes). When the batch size or block size is met or the batch timeout is reached, the OSNs encapsulate transactions into a new block. This means that one G(t) might be divided into multiple blocks. The following block-cutting parameters are used in experimental trials (unless explicitly specified otherwise): block timeout=2 seconds; block size=512 KB; batch size=30 transactions per block.

Figure 9:
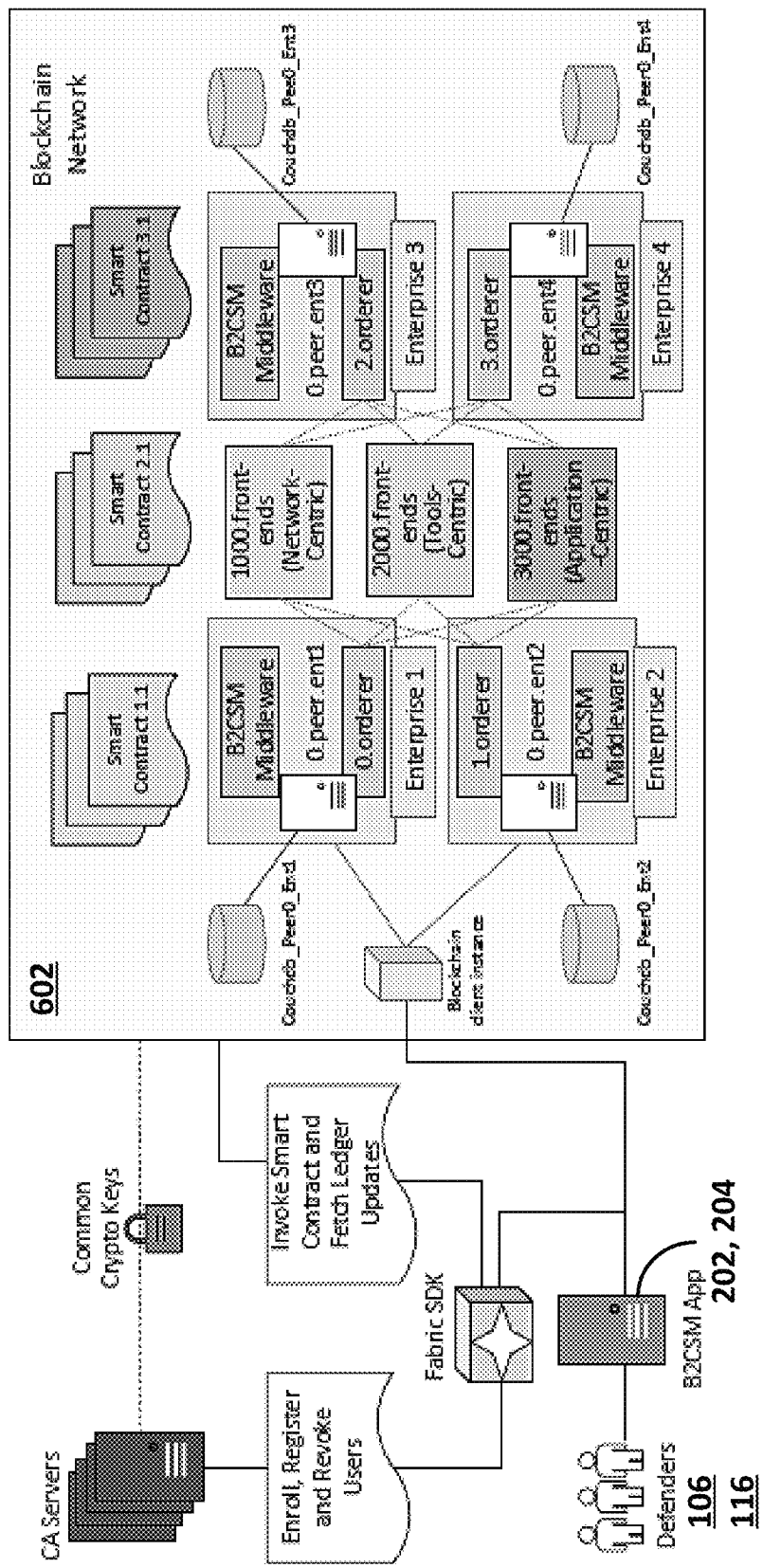
FIG. 9 illustrates an exemplary B2CSM prototype system in accordance with various embodiments of the present disclosure.

In order to analyze the performance of B2CSM, a prototype system is implemented. The preceding design choices influence the prototype system which is depicted in FIG. 9. The B2CSM prototype system is built on top of a browser-server architecture, meaning that the B2CSM applications provide the cyber defender computing devices with a web-based interface to interact with the B2CSM system. The B2CSM application has two modules. The first module displays blockchain-related information, including a dashboard with various kinds of information (e.g., B2CSM blockchain's peer nodes' IP addresses, the numbers of blocks and transactions for each channel). In various embodiments, a cyber defender computing device is presented the B2CSM blockchain's status in real-time. The second module offers a cyber defender computing device with a web-based interface to run the desired CSM functions with input cyber intelligence data and receive the response from the CSM functions. In the B2CSM architecture, one or multiple CAs are used for enrolling B2CSM blockchain's users and peers, which permits enforcing security policies (e.g., only an administrator can install smart contracts on peers). The functionality of the CA can be provided by an external CA, which may be managed by the B2CSM consortium; alternatively, each defender can maintain a CA while recognizing certificates issued by others.

The Fabric software development kit provides the interfaces for interacting with the blockchain network (e.g., register users, install chaincode, instantiate chaincode, invoke transactions, and query ledgers). A Fabric client instance is instantiated whenever the cyber defender needs to communicate with the B2CSM blockchain network. This client instance only needs to be instantiated once, and subsequent sessions with the blockchain network can continue to use it.

In order to evaluate the performance of the B2CSM prototype system, experiments were conducted with the prototype system involving (as an example) four defenders or enterprises, denoted by ent1, ent2, ent3, and ent4, respectively. Each defender has a range of CSMAs, which collects data and writes the data to the B2CSM blockchain (i.e., ledger). The blockchain includes four peer nodes (one per enterprise), denoted by 0.peer.ent1, 0.peer.ent2, 0.peer.ent3, and 0.peer.ent4, respectively. These peer nodes are the full nodes for the B2CSM blockchain. There are four couchdb databases: Couchdb_Peer0_Ent1, Couchdb_Peer0_Ent2, Couchdb_Peer0_Ent3, and Couchdb_Peer0_Ent4. Each couchdb state database is connected with one peer node for recording its current world state.

There are four ordering nodes (one per enterprise): 0.orderer, 1.orderer, 2.orderer, and 3.orderer. These four nodes act as the replicas for BFT SMaRt-based ordering service, which assures that as long as the number of malicious nodes does not exceed one-third (i.e., one when there are four nodes), the ordering service will not be disrupted.

There are three frontends, named 1000.frontends (for N-CSM), 2000.frontends (for T-CSM), and 3000.frontends (for A-CSM). These frontend nodes are responsible for (i) relaying the transactions that are issued by the B2CSM clients to the consensus protocol and (ii) forwarding the blocks that are generated by the ordering nodes to peer nodes.

The hardware platform for conducting the experiments is a small-scale cluster composed of four Virtual Machines (VMs) residing on two heterogeneous servers, representing four enterprises to formulate a consortium B2CSM blockchain. One server is a Dell PowerEdge R740, which is equipped with 2 Intel(R) Xeon(R) CPU Silver 4114 processors (with 13.75 MB L3 cache and 20 cores of 2.2 GHz for each processor), 256 GB (16 slots×16 GB/slot) 2400 MHz DDR4 RDIMM memory, and an 8 TB (8 slots×1 TB/slot) 2.5 inch SATA hard drive. The other server is a Dell Precision Rack 7910, which is equipped with 2 Intel(R) Xeon(R) CPU E5-2630 v3 processors (with 15 MB cache and 6 cores of 2.4 GHz for each processor), 16 GB 2133 MHz DDR4 RDIMM ECC memory, and a 256 GB 2.5 inch SATA solid state drive. All of the four VMs have the same configuration of 8 vCPUs, 24 GB memory and 800 GB hard drive and are connected via a Local Area Network (LAN). The operating system in each VM is Ubuntu 16.04 (64-bit) with kernel version 4.15. The Fabric version is 1.2, the Java version is 1.8.0_211, and the golang version is 1.11.10.

Figure 10A:
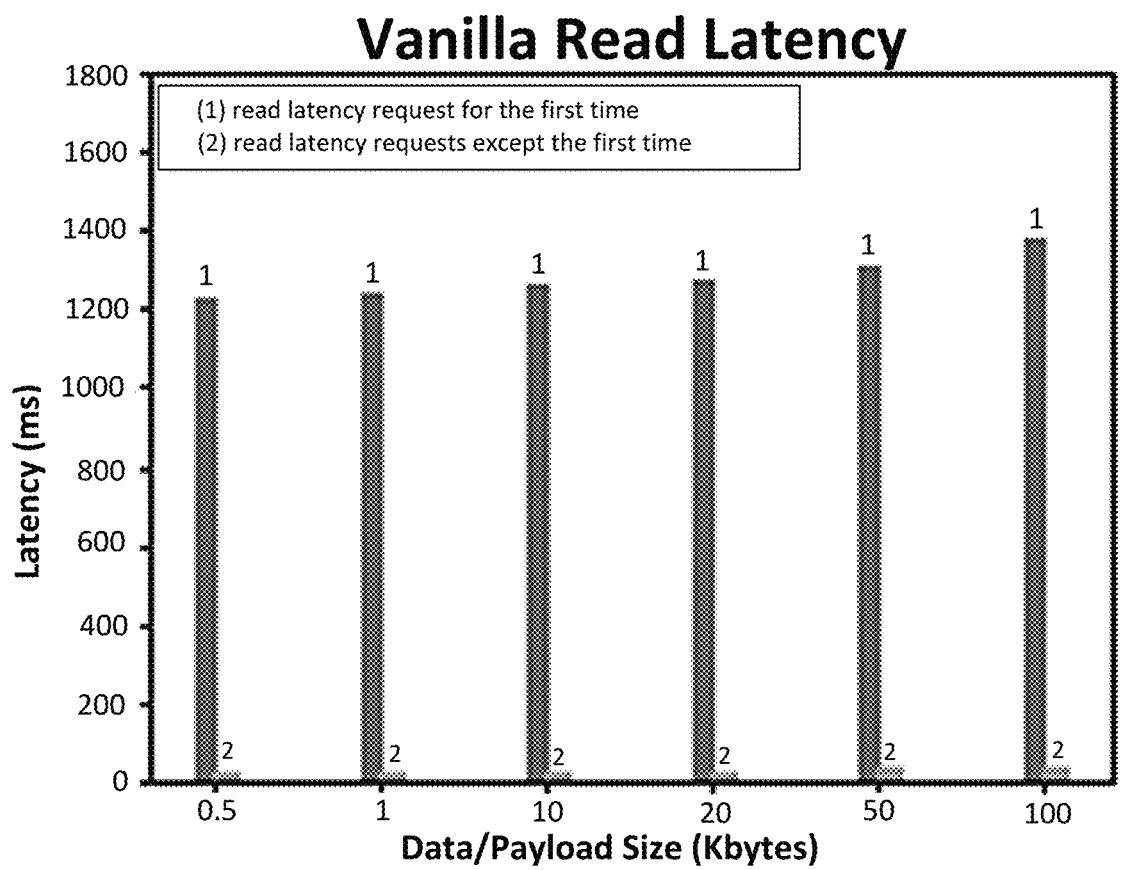
FIGS. 10A-10C illustrate a B2CSM's vanilla performance (averaged over 5 independent runs) in accordance with an experimental trial of the present disclosure.

FIG. 10A plots the B2CSM blockchain's vanilla read latency. Experimental results show that the read latency is small because its queries are geared towards the world state instead of the blocks. The latency slightly increase as the transaction size. It is worth mentioning that in the experiments, the VMs or full nodes are located in a single LAN, meaning that the read latency would be larger when the VMs or full nodes are deployed in a wide area network (WAN).

Figure 10B:
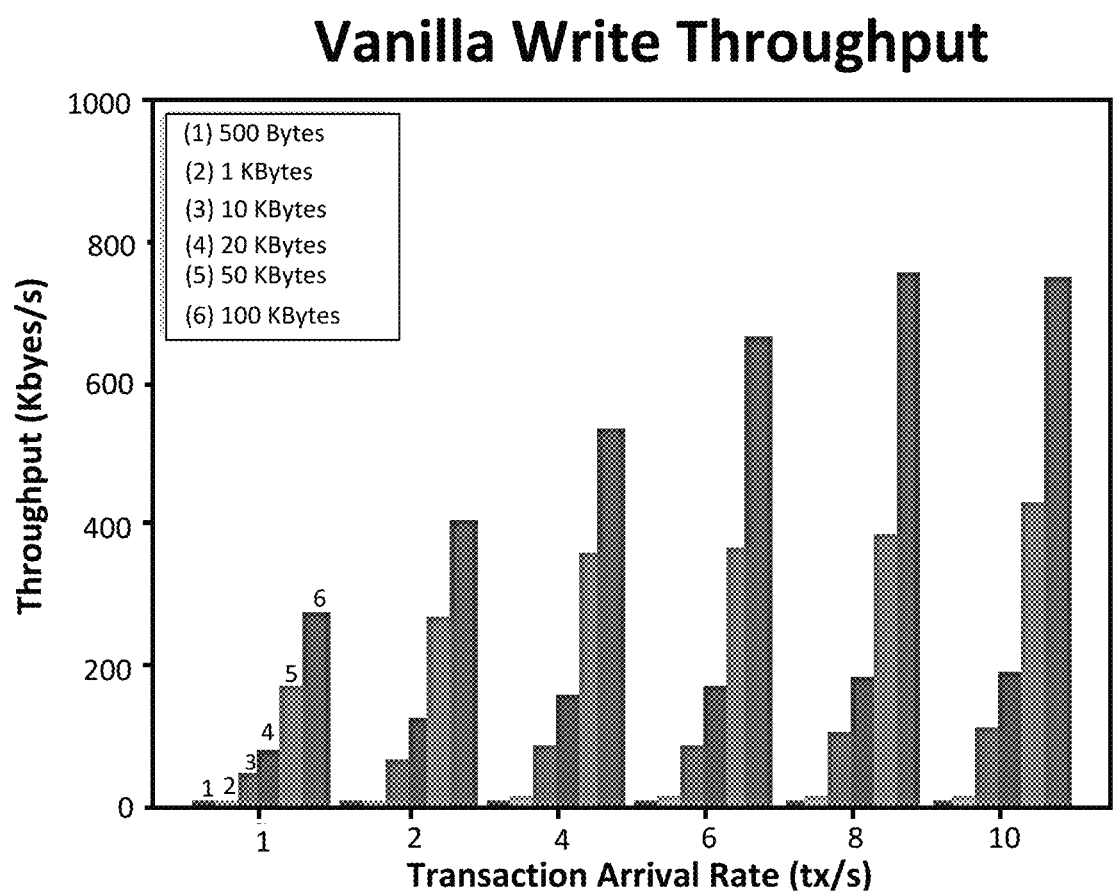

FIG. 10B plots B2CSM blockchain's vanilla write throughput, from which the following observations are made. First, for a fixed transaction arrival rate, increasing the payload/data size leads to an increase in the throughput (e.g., from 500 bytes to 100 KBytes when the transaction arrival rate is 1 transaction per second). This suggests that the time cost has a smaller impact on the throughput. Second, for a fixed transaction arrival rate, when the data size is small, the size itself becomes the bottleneck of the throughput. Meanwhile, the data size should be limited to a certain threshold, since experiment trials suggest that once the data size in a transaction exceeds 100 KBytes, a timeout is often incurred and the transaction data cannot be successfully written to the blockchain.

Figure 10C:
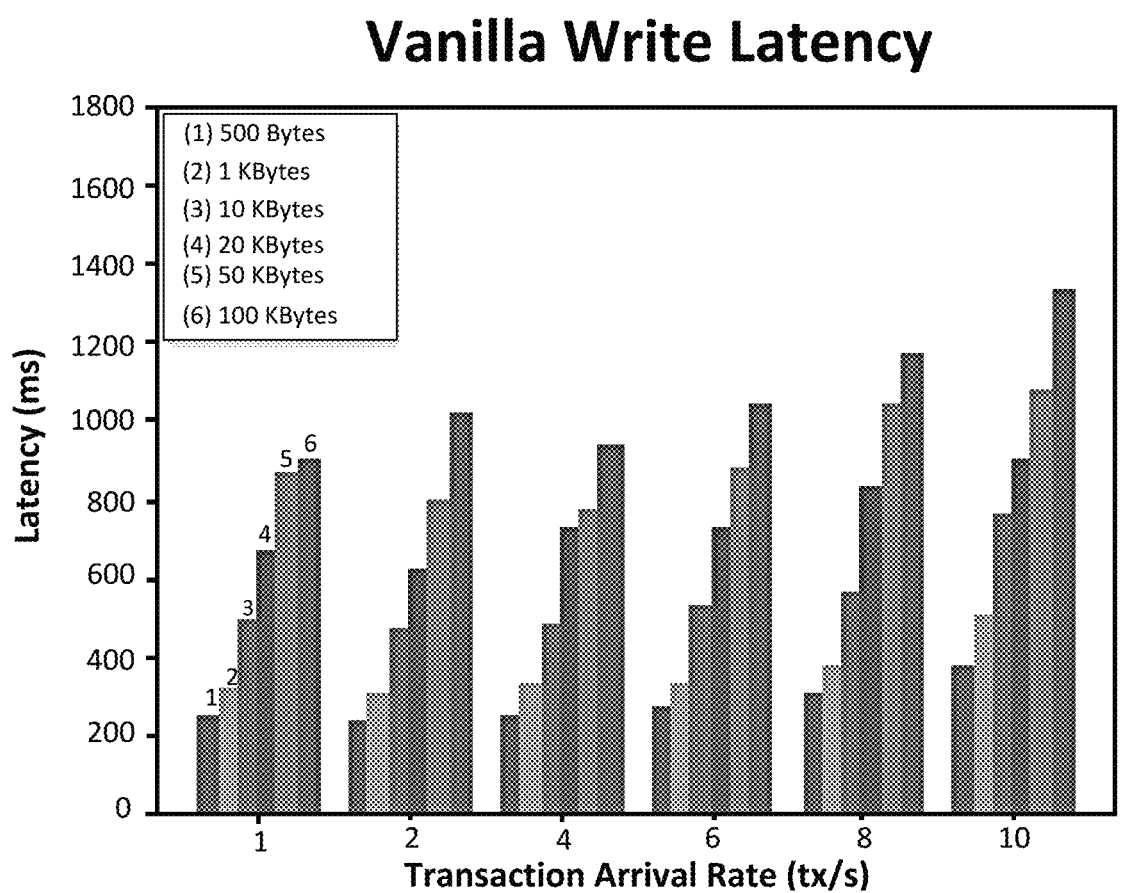

FIG. 10C plots the write latency corresponding to the throughput shown in FIG. 10B, from which the following observations are made. First, for a fixed transaction arrival rate, the latency increases with the data size because a bigger volume of data needs to be transferred. Second, for a fixed data size, the latency varies slightly when the transaction arrival rate is relatively small. However, the delay gradually increases with the transaction arrival rate. This is caused by the following two factors: (i) During the process of data replication, each transaction submission is bound to a unique thread and each VM in the experiment is equipped with 8 vCPUs, indicating that handling 8 threads in parallel is the optima for a single VM. When a B2CSM App simultaneously submits multiple transactions, the other nodes need to simulate the transactions because the endorsement policy requires 2f+1 nodes to endorse (where f=1 in the experiment). Therefore, if the number of submitted transactions exceeds 8, the endorsing nodes need more time to complete the endorsement procedure, resulting in a higher latency; and (ii) The communication complexity of the BFT-SMaRt consensus protocol is $\mathcal{O}(n^2)$, where n is the number of full nodes in a blockchain network and n=4 in the experiment. A higher transaction arrival rate means that more data will need to be simultaneously transferred between the full nodes, incurring a higher latency. As a consequence, the throughput stays relatively stable, as shown in FIG. 10B when the transaction arrival rate is 8 transactions per second and 10 transactions per second.

In summary, a small transaction size and a low transaction arrival rate lead to a lower throughput; and a large transaction size and a high transaction arrival rate do not really improve the throughput and actually could congest the network (i.e., a longer waiting time in transferring message can trigger timeouts and fail the writing of data to the B2CSM blockchain). This highlights the importance in feeding the data (wrapped as transactions) with a proper transaction size and transaction arriving rate (while noting that for a given setting, such as N-CSM, the total volume of data is inherent to the network in question). Experiment trials show that 100 KBytes per data unit and 8 data units per second achieve a better throughput. In order to achieve such a better throughput in general, the CSMAs can split the large dataset into data units and maintain a buffer to periodically submit these data units as transactions to blockchain network. Besides, adjusting the endorsement policy (e.g., only one organization or full node, rather than all of them, is required to endorse the transactions) can contribute to improving the throughput. However, this gain in throughput demands a stronger trust assumption about the consortium peers; otherwise, B2CSM will achieve a lower degree of robustness against Byzantine faults.

Therefore, transaction arrival rate and transaction size are two parameters that may need to be carefully selected because they collectively have a big impact on the B2CSM blockchain's throughput. Accordingly, these parameters may need to be finetuned based on the computer resources available to the full nodes of the B2CSM blockchain.

To evaluate B2CSM performance based on experiments with real-world datasets, we first describe the real world datasets for N-CSM, T-CSM and A-CSM experiments. For N-CSM purposes, network traffic can be collected from within an enterprise network. In an N-CSM experiment trial, we use a dataset collected from a honeypot, in which the dataset contains a /22 external subnet and the experiment is based on the dataset corresponding to 7 days & the time resolution is a day (i.e., each day is a time interval). In a T-CSM experiment, we use a dataset collected by the USMA team from the 2017 CDX Competition, as if it were collected at a production enterprise network, which indeed instantiates the T-CSM model highlighted in FIG. 4A. Because this dataset does not have ground truth tags, for our experimental purposes, we consider attack traffic to be: (i) traffic which creates alerts according to the intrusion detection system that was installed during the competition; or (ii) traffic which creates alerts according to some intrusion detection system that is employed when conducting our experiment. For the preceding (ii), we use a popular open-sourced intrusion detection system, Suricata, with a popular, free ruleset referred to as Emerging Threats. Suricata's alerts are stored in an AGTSR G(t) for time window t, where nodes represent the source and destination IP addresses of each attack.

In A-CSM experiments, we consider the example of a cyber defender computing device recording how an enterprise's browsers have accessed the external URLs. In the simplest case, the cyber data records (browser, URL, timestamp), meaning that the browser accessed the URL at a time given by a timestamp. The A-CSM experiments use data was received over the period of Feb. 1, 2019-Feb. 6, 2019. The data contains mappings between malware instances, which are treated as browser applications for our purpose, and the external URLs, such that the data is pre processed into a bipartite AGTSR over the time horizon of T=6 days.

Figure 11A:
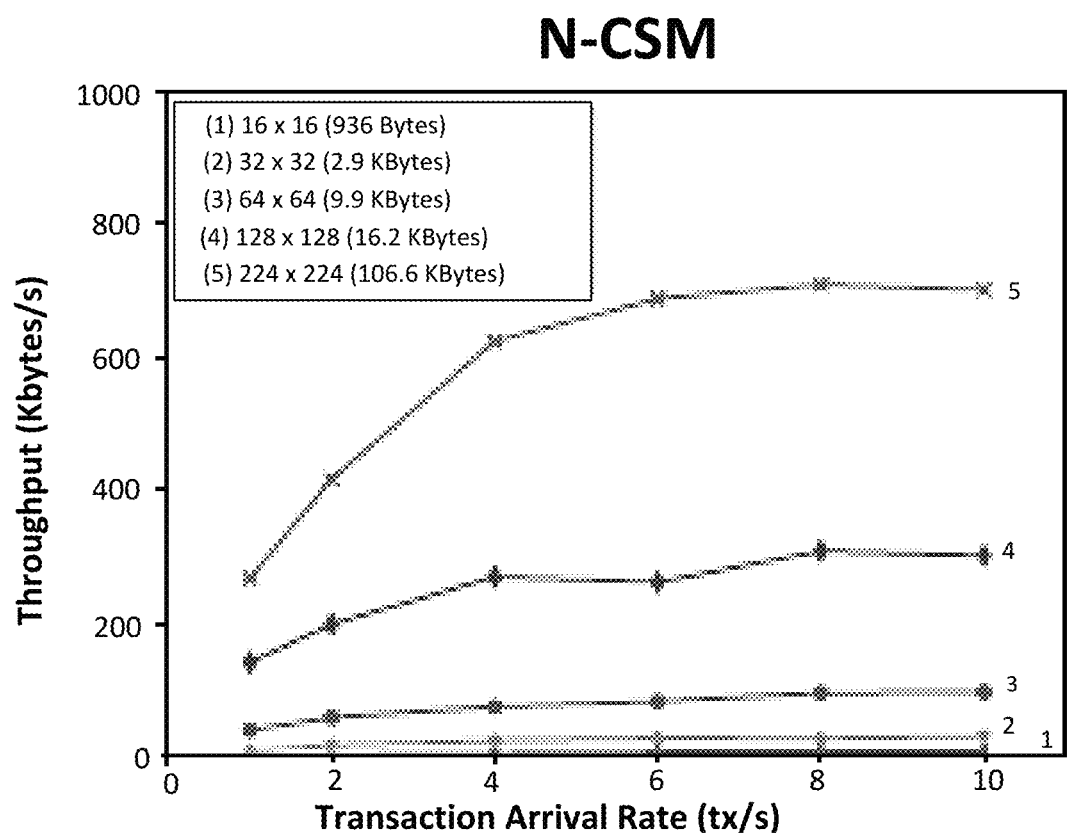
FIGS. 11A-11C illustrate B2CSM's Data Replication Throughput (DRT) in N-CSM, T-CSM, and A-CSM experiments (averaged over 5 independent runs) in accordance with the present disclosure.
Figure 11B:
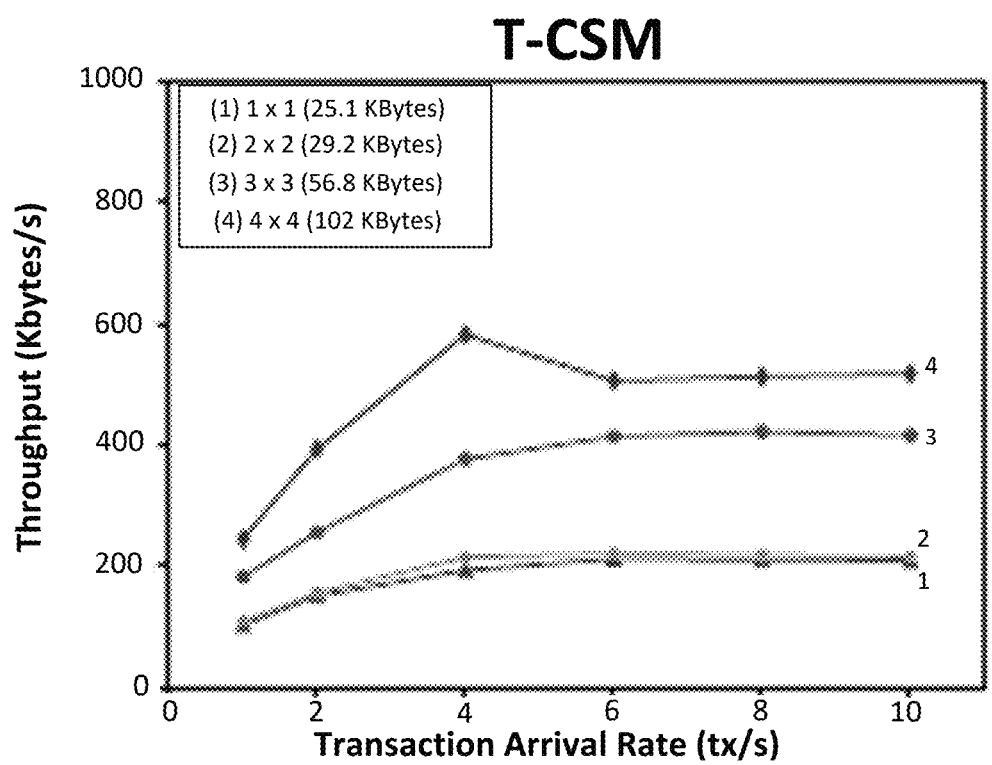
Figure 11C:
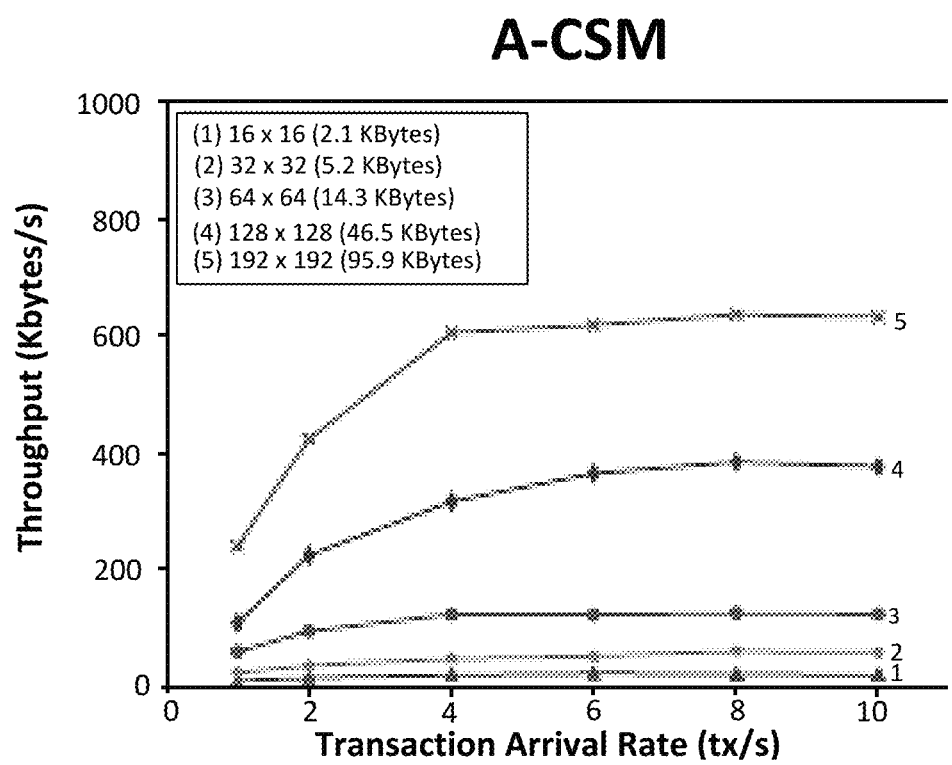

The experimental results are reported in DRT (Data Replication Throughput) and AQL (Application Query Latency). FIGS. 11A-11C plot B2CSM's DRT in N-CSM, T-CSM and A-CSM experiments using the real world datasets mentioned above. We observe that the throughput varies with CSM scenarios and that the throughput of T-CSM is significantly different than the throughputs of N-CSM and A-CSM. This is caused by the fact that the T-CSM data is quite different from the N-CSM and A-CSM data as follows. The T-CSM data volume is large and the volumes of data units vary substantially because some data units contain more empty elements than others (recalling that T-CSM data is about alerts); in contrast, N-CSM data and A-CSM data are uniformly distributed (i.e., volumes of data units are about the same) which explains why T-CSM has a lower throughput. From the throughput, we observe that after the transaction arrival rate exceeds 4, the throughput stays stable, especially for N-CSM and A-CSM, which may be caused by the limited computer resources on the full nodes (i.e., VMs) in the experiments. In T-CSM, we observe an "abnormal" throughput at transaction arrival rate 4 and data unit of 4×4 (i.e., 102 KBytes per unit); this may be caused by the limited computer resources at the full nodes and the cumulative effect of non-uniform distribution in the units' data volumes. Nevertheless, the overall trend is similar to the trend that is observed from B2CSM blockchain's vanilla write throughput.

Figure 12A:
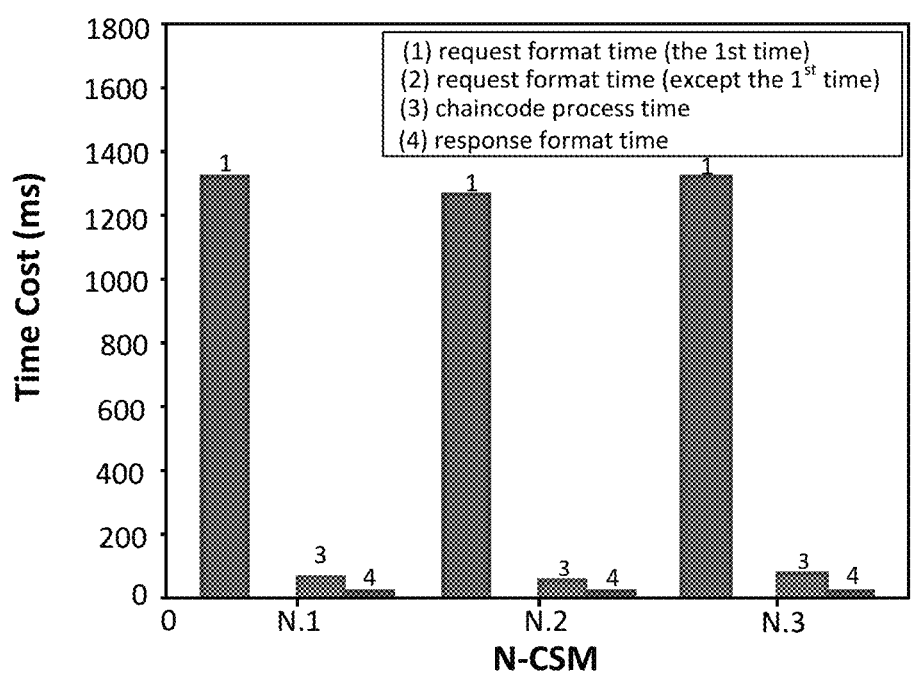
FIGS. 12A-12C illustrate B2CSM's Application Query Latency (AQL) in N-CSM, T-CSM and A-CSM experiments (averaged over 5 independent runs) in accordance with the present disclosure.
Figure 12B:
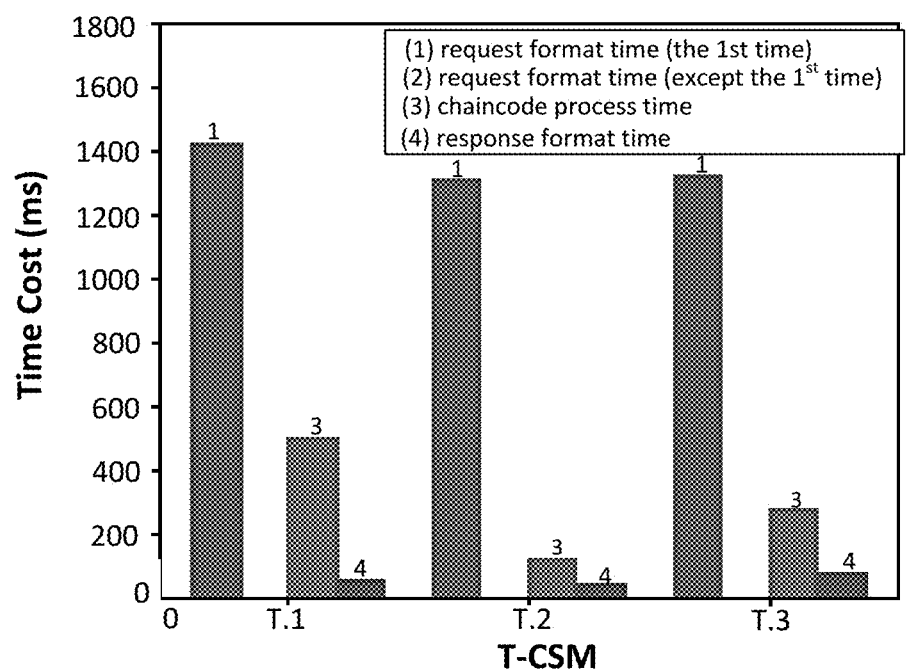
Figure 12C:
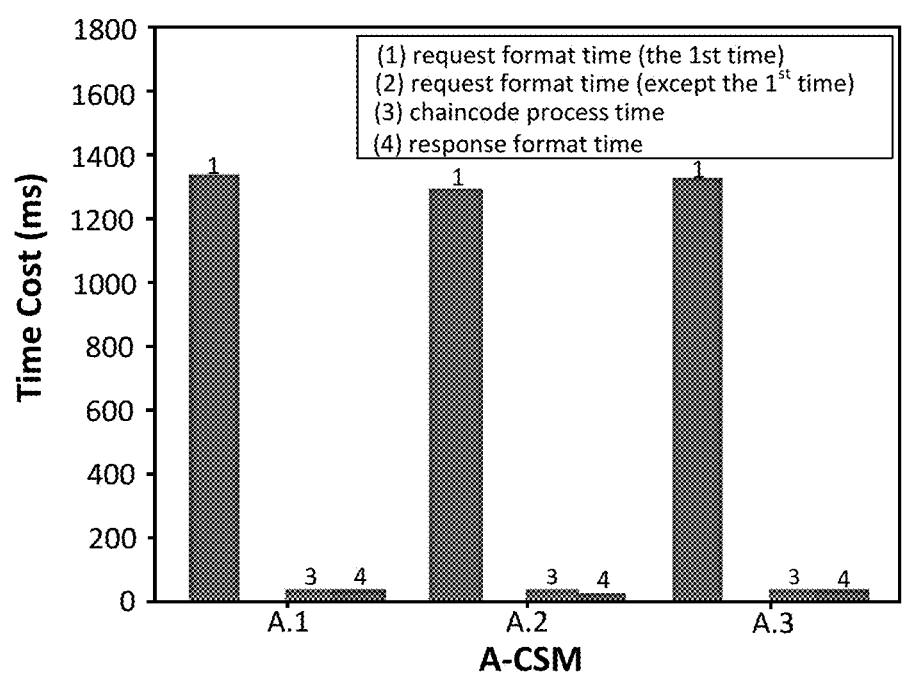

FIGS. 12A-12C plot B2CSM's AQL in N-CSM, T-CSM and A-CSM experiments with the real world datasets mentioned above. We observe the following: (i) For the request formatting time, it takes about 1.4 seconds for the first invocation of a CSM function, but much smaller time for the next invocation of a CSM function. This is because the former requires initialization of a Hyperledger Fabric client object on behalf of the B2CSM application before connecting to the blockchain network, whereas, the later can simply reuse the object created by the former; (ii) For the chaincode processing time, the time cost varies for different invocations of CSM functions; and (iii) The response time is relatively stable (i.e., varies only slightly). Table 1 (below) further presents the break-down of the latency time, where $\mathcal{T}_{reqf}^1$ is the request formatting time when a CSM function is invoked from the first time by a B2CSM application (on a web interfaced server computing device) and $\mathcal{T}_{reqf}^2$ is the request formatting time after making the first invocation to a CSM function. This distinction is made because as observed above, the former is substantially longer than the latter. Besides, the chaincode processing time depends on the smart contract complexity (i.e., the complexity of a CSM function). Finally, the response formatting time $\mathcal{T}_{reqf}$ is bigger than the request formatting time $\mathcal{T}_{reqf}^3$ when disregarding objective-creating time during the first invocation of a CSM function, which is because each full node needs to sign the query results before sending back to the B2CSM application. Therefore, the response delay is largely due to the creation of a Hyperledger Fabric client object corresponding to a CSM function invoked from a B2CSM application for the first time. Reducing the response delay will substantially improve the response time.

TABLE 1

B2CSM's application query latency (unit: ms).

| Latency | CSM function | $\mathcal{T}_{reaf}^1$ | $\mathcal{T}_{reaf}^2$ | $\mathcal{T}_{op}$ | $\mathcal{T}_{resf}$ |
| --- | --- | --- | --- | --- | --- |
| *N-CSM | N.1 | 1321 | 0.17 | 69.18 | 23.47 |
| | N.2 | 1265 | 0.18 | 57.6 | 23.49 |
| | N.3 | 1329 | 0.17 | 75.86 | 18.37 |
| *T-CSM | T.1 | 1420 | 0.19 | 504.27 | 52.81 |
| | T.2 | 1317 | 0.16 | 120.13 | 46.92 |
| | T.3 | 1327 | 0.17 | 279.63 | 72.66 |
| *A-CSM | A.1 | 1336 | 0.21 | 28.92 | 28.14 |
| | A.2 | 1287 | 0.19 | 27.51 | 24.23 |
| | A.3 | 1324 | 0.17 | 30.33 | 30.62 |

Figure 13:
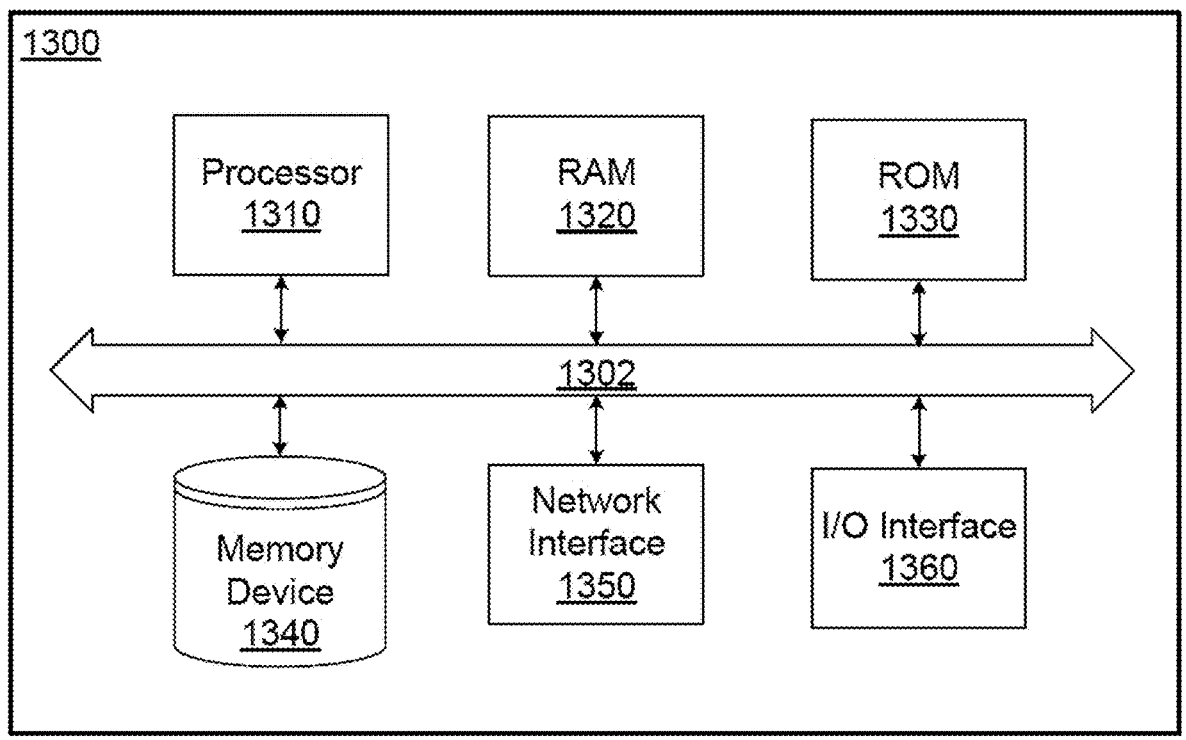
FIG. 13 illustrates an example hardware diagram of a computing device in accordance with various embodiments of the present disclosure.

Turning to FIG. 13, an example hardware diagram of a computing device 1300 is illustrated. Any of the functionality described herein may be implemented, in part, using one or more elements of the computing device 1300. The computing device 1300 can include one or more of a processor 1310, a Random Access Memory ("RAM") 1320, a Read Only Memory ("ROM") 1330, a memory device 1340, a network interface 1350, and an Input Output ("I/O") interface 1360. The elements of the computing device 1300 are communicatively coupled via a bus 1302.

The processor 1310 can include an arithmetic processor, Application Specific Integrated Circuit ("ASIC"), or other types of hardware or software processors. The RAM and ROM 1320 and 1330 can include a memory that stores computer-readable instructions to be executed by the processor 1310. The memory device 1330 stores computer-readable instructions thereon that, when executed by the processor 1310, direct the processor 1310 to execute various aspects of the present disclosure described herein. When the processor 1310 includes an ASIC, the processes described herein may be executed by the ASIC according to an embedded circuitry design of the ASIC, by firmware of the ASIC, or both an embedded circuitry design and firmware of the ASIC. As a non-limiting example group, the memory device 1330 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 1350 can include hardware interfaces to communicate over data networks. The I/O interface 1360 can include device input and output interfaces such as keyboard, pointing device, display, communication, and other interfaces. The bus 1302 can electrically and communicatively couple the processor 1310, the RAM 1320, the ROM 1330, the memory device 1340, the network interface 1350, and the I/O interface 1360, so that data and instructions may be communicated among them.

In operation, the processor 1310 is configured to retrieve computer-readable instructions stored on the memory device 1340, the RAM 1320, the ROM 1330, or another computer readable storage medium, and copy the computer-readable instructions to the RAM 1320 or the ROM 1330 for execution, for example. The processor 1310 is further configured to execute the computer-readable instructions to implement various aspects and features of the present disclosure. For example, the processor 1310 may be adapted and configured to execute the processes described above including the processes described as being performed by the modules of the ranking and optimizing front end. Also, the memory device 1340 may store a data stored.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

Therefore, at least the following is claimed:

1. A system comprising:
a computing device; and
a Cyber Security Management (CSM) service executable in the computing device, wherein the CSM service causes the computing device to at least:

obtain cyber intelligence input data, via a consortium blockchain channel, shared from a cyber defender computing device that is a participant of the consortium blockchain channel, wherein the cyber defender computing device manages network security of a network, wherein the cyber intelligence input data identifies a cyber attacker or a victim of a cyber attack on the network, wherein the consortium blockchain channel provides a blockchain ledger for on-chain data storage and a state database for on-chain data storage;

execute one or more CSM functions with the cyber intelligence input data received from the cyber defender computing device via the consortium blockchain channel;

store, via the one or more CSM functions, cyber data collected by the one or more CSM functions to a local off-chain database maintained by the computing device, wherein the cyber data includes discovery of an identification of a potential cyber attacker or potential victim of the cyber attack on the network;

share the discovery of the identification of the potential cyber attacker or the potential victim of the cyber attack on the network as new input cyber intelligence data on the consortium blockchain channel by storing the new input cyber intelligence data in the state database of each participant in the consortium blockchain channel after completion of a consensus protocol with other participants in the consortium blockchain channel, wherein the blockchain ledger of the consortium blockchain channel is updated to include an invocation history of the one or more CSM functions that discovered the identification of the potential cyber attacker or the potential victim of the cyber attack on the network; and output an alert to the cyber defender computing device with the potential cyber attacker or the potential victim of the cyber attack on the network managed by the cyber defender computing device.

2. The system of claim 1, wherein the CSM service causes the computing device to at least alert the cyber defender computing device of a new defense capability for preventing a new cyber attack on the network managed by the cyber defender computing device.

3. The system of claim 1, wherein the cyber data comprises network attack paths through which a cyber attack victim was compromised.

4. The system of claim 1, wherein the CSM service outputs a list of network entities that were accessed by the cyber attacker identified in the cyber intelligence input data.

5. The system of claim 1, wherein the cyber intelligence input data further identifies a time window in which the cyber attack occurred.

6. The system of claim 5, wherein the CSM service outputs an alert for a software vulnerability that existed prior to discovery of the cyber attack.

7. The system of claim 1, wherein the CSM service outputs a list of potential cyber attackers based on communications with the victim of the cyber attack identified in the cyber intelligence input data.

8. The system of claim 1, wherein the victim of the cyber attack comprises a browser application implemented within the network managed by the cyber defender computing device, wherein the CSM service outputs a list of other browser applications that accessed a network location visited by the browser application.

9. The system of claim 1, wherein the computing device is a full node of a blockchain network, wherein the CSM service is implemented as a smart contract on the blockchain network.

10. The system of claim 9, wherein before being stored in the state database, the CSM service causes the computing device to split the new input cyber intelligence data into multiple chunks whose size is limited by a transaction size of the blockchain network.

11. A method comprising:
obtaining, by a computing device via a consortium blockchain channel, cyber intelligence input data shared from a cyber defender computing device that is a participant of the consortium blockchain channel, wherein the cyber defender computing device manages network security of a network, wherein the cyber intelligence input data identifies a cyber attacker or a victim of a cyber attack on the network, wherein the consortium blockchain channel provides a blockchain ledger for on-chain data storage and a state database for on-chain data storage;
executing, by the computing device, one or more Cyber Security Management (CSM) functions with the cyber intelligence input data received from the cyber defender computing device via the consortium blockchain channel;
storing, via the one or more CSM functions, cyber data collected by the one or more CSM functions to the state database maintained by the computing device, wherein the cyber data includes an identification of a potential cyber attacker or potential victim of the cyber attack on the network discovered by the one or more CSM functions;
sharing, by the computing device, the discovery of the identification of the potential cyber attacker or the potential victim of the cyber attack on the network as new input cyber intelligence data on the consortium blockchain channel by storing the new input cyber intelligence data in the state database of each participant in the consortium blockchain channel after completion of a consensus protocol with other participants in the consortium blockchain channel, wherein the blockchain ledger of the consortium blockchain channel is updated to include an invocation history of the one or more CSM functions that discovered the identification of the potential cyber attacker or the potential victim of the cyber attack on the network; and
outputting, by the computing device, an alert to the cyber defender computing device with the potential cyber attacker or the potential victim of the cyber attack on the network managed by the cyber defender computing device.

12. The method of claim 11, further comprising alerting, by the computing device, the cyber defender computing device of a new defense capability for preventing a new cyber attack on the network managed by the cyber defender computing device.

13. The method of claim 11, further comprising outputting, by the computing device, a list of network entities that were accessed by the cyber attacker identified in the cyber intelligence input data.

14. The method of claim 11, wherein the cyber intelligence input data further identifies a time window in which a cyber attack occurred.

15. The method of claim 14, further comprising outputting, by the computing device, an alert for a software vulnerability that existed prior to discovery of the cyber attack.

16. The method of claim 11, further comprising outputting, by the computing device, a list of potential cyber attackers based on communications with the victim of the cyber attack identified in the cyber intelligence input data.

17. The method of claim 11, wherein the victim of the cyber attack comprises a browser application implemented within the network managed by the cyber defender computing device, the method further comprising outputting, by the computing device, a list of other browser applications that accessed a network location visited by the browser application.

18. The method of claim 11, wherein the computing device is a full node of a blockchain network, wherein the one or more CSM functions are implemented as a smart contract on the blockchain network.

19. The method of claim 18, wherein before being stored in the state database, the new input cyber intelligence data is split into multiple chunks whose size is limited by a transaction size of the blockchain network.

20. A non-transitory computer-readable medium embodying a program executable in at least one computing device, wherein when executed the program causes the at least one computing device to at least:
obtain cyber intelligence input data, via a consortium blockchain channel, shared from a cyber defender computing device that is a participant of the consortium blockchain channel, wherein the cyber defender computing device manages network security of a network, wherein the cyber intelligence input data identifies a cyber attacker or a victim of a cyber attack on the network, wherein the consortium blockchain channel provides a blockchain ledger for on-chain data storage and a state database for on-chain data storage;
execute one or more Cyber Security Management (CSM) functions with the cyber intelligence input data received from the cyber defender computing device via the consortium blockchain channel;
store, via the one or more CSM functions, cyber data collected by the one or more CSM functions to the state database maintained by the at least one computing device, wherein the cyber data includes an identification of a potential cyber attacker or potential victim of the cyber attack on the network discovered by the one or more CSM functions;
share the discovery of the identification of the potential cyber attacker or the potential victim of the cyber attack on the network as new input cyber intelligence data on the consortium blockchain channel by storing the new input cyber intelligence data in an the state database of each participant in the consortium blockchain channel after completion of a consensus protocol with other participants in the consortium blockchain channel, wherein the blockchain ledger of the consortium blockchain channel is updated to include an invocation history of the one or more CSM functions that discovered the identification of the potential cyber attacker or the potential victim of the cyber attack on the network; and
output an alert to the cyber defender computing device with the potential cyber attacker or the potential victim of the cyber attack on the network managed by the cyber defender computing device.

\* \* \* \* \*